United States Patent
Lee et al.

(10) Patent No.: US 10,039,070 B2
(45) Date of Patent: Jul. 31, 2018

(54) METHOD FOR TRANSMITTING D2D SIGNAL AND TERMINAL THEREFOR

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/513,478

(22) PCT Filed: Sep. 24, 2015

(86) PCT No.: PCT/KR2015/010126
§ 371 (c)(1),
(2) Date: Mar. 22, 2017

(87) PCT Pub. No.: WO2016/048073
PCT Pub. Date: Mar. 31, 2016

(65) Prior Publication Data
US 2017/0325190 A1    Nov. 9, 2017

Related U.S. Application Data

(60) Provisional application No. 62/165,222, filed on May 22, 2015, provisional application No. 62/149,690, (Continued)

(51) Int. Cl.
*H04W 56/00* (2009.01)
*H04W 76/02* (2009.01)
(Continued)

(52) U.S. Cl.
CPC ..... *H04W 56/0025* (2013.01); *H04W 76/023* (2013.01); *H04W 76/14* (2018.02); *H04W 88/02* (2013.01)

(58) Field of Classification Search
CPC ............. H04W 56/0025; H04W 76/14; H04W 76/023; H04W 88/02; H04W 88/005;
(Continued)

(56) References Cited

U.S. PATENT DOCUMENTS

2011/0294447 A1    12/2011   Hu et al.
2013/0109301 A1*   5/2013    Hakola ................. H04W 76/14
                                                         455/39
(Continued)

FOREIGN PATENT DOCUMENTS

JP    2013-529416 A    7/2013
WO    2013125873 A1   8/2013
(Continued)

OTHER PUBLICATIONS

Huawei, HiSilicon: "Resource allocation for D2D synchronization signals", 3GPP TSG RAN WG1 Meeting #77, R1-141919, May 19-23, 2014.
(Continued)

*Primary Examiner* — Afsar M Qureshi
(74) *Attorney, Agent, or Firm* — Dentons US LLP

(57) ABSTRACT

Disclosed is a method for transmitting a synchronization signal. The method for transmitting a synchronization signal according to the present application may comprise the step of transmitting a synchronization signal according to a first action or a second action previously configured on the basis of a command from a base station.

10 Claims, 16 Drawing Sheets

Related U.S. Application Data filed on Apr. 20, 2015, provisional application No. 62/149,518, filed on Apr. 17, 2015, provisional application No. 62/109,636, filed on Jan. 30, 2015, provisional application No. 62/108,527, filed on Jan. 27, 2015, provisional application No. 62/086,173, filed on Dec. 1, 2014, provisional application No. 62/080,247, filed on Nov. 14, 2014, provisional application No. 62/076,470, filed on Nov. 6, 2014, provisional application No. 62/061,706, filed on Oct. 9, 2014, provisional application No. 62/061,612, filed on Oct. 8, 2014, provisional application No. 62/061,690, filed on Oct. 8, 2014, provisional application No. 62/061,128, filed on Oct. 7, 2014, provisional application No. 62/054,950, filed on Sep. 24, 2014.

(51) Int. Cl.
*H04W 76/14* (2018.01)
*H04W 88/02* (2009.01)

(58) Field of Classification Search
CPC . H04W 28/08; H04W 72/005; H04W 72/042; H04W 72/046; H04L 8/005
See application file for complete search history.

(56) References Cited

U.S. PATENT DOCUMENTS

| | | | |
|---|---|---|---|
| 2013/0124937 A1 | 5/2013 | Kim et al. | |
| 2014/0003262 A1* | 1/2014 | He | H04W 28/08 370/252 |
| 2014/0112194 A1* | 4/2014 | Novlan | H04W 48/16 370/254 |
| 2014/0206348 A1* | 7/2014 | Johnsson | H04W 8/005 455/434 |
| 2014/0211705 A1* | 7/2014 | Baek | H04W 76/023 370/329 |
| 2014/0242963 A1 | 8/2014 | Novlan et al. | |
| 2014/0256369 A1 | 9/2014 | Ji et al. | |
| 2014/0323126 A1 | 10/2014 | Ro et al. | |
| 2015/0023191 A1 | 1/2015 | Kim et al. | |
| 2015/0043448 A1 | 2/2015 | Chatterjee et al. | |
| 2016/0007372 A1 | 1/2016 | Fujishiro et al. | |
| 2016/0044619 A1 | 2/2016 | Ryu et al. | |
| 2016/0219541 A1 | 7/2016 | Chatterjee et al. | |
| 2016/0227518 A1 | 8/2016 | Li et al. | |
| 2016/0249311 A1* | 8/2016 | Yu | H04W 4/70 |
| 2017/0027013 A1 | 1/2017 | Kim et al. | |
| 2017/0135054 A1 | 5/2017 | Liu et al. | |
| 2017/0325190 A1 | 11/2017 | Lee et al. | |

FOREIGN PATENT DOCUMENTS

| | | |
|---|---|---|
| WO | 2014/031829 A2 | 2/2014 |
| WO | 2014113537 A1 | 7/2014 |
| WO | 2014/130156 A1 | 8/2014 |
| WO | 2017/142505 A1 | 9/2014 |
| WO | 2014137170 A1 | 9/2014 |

OTHER PUBLICATIONS

Intel Corporation: "Resource Allocation for Mode-1 D2D Operation", 3GPP TSG RAN WG1 Meeting #78, R1-142872, Aug. 18-24, 2014.
CATT: "Resource allocation for D2D synchronization", 3GPP TSG RAN WG1 Meeting #78, R1-142892, Aug. 18-22, 2014.
Qualcomm Incorporated: "Resource allocation for D2D Synchronization", 3GPP TSG-RAN WG1 #78, R1-142963, Aug. 18-22, 2014.
Huawei, HiSilicon: "Resources for D2D synchronization signals", 3GPP TSG RAN WG1 Meeting #78, R1-142986, Aug. 18-21, 2014.
Samsung: "Resource pool configuration for type-1 discovery", 3GPP TSG RAN WG1 Meeting #78, R1-143081, Aug. 18-22, 2014.
Samsung: "Discovery operation with D2DSS configured", 3GPP TSG RAN WG1 Meeting #78, R1-143083, Aug. 18-22, 2014.
ZTE: "Resource Allocation for Synchronization Signal and Channel", 3GPP TSG-RAN WG1 #78, R1-143141, Aug. 18-22, 2014.
LG Electronics: "UE Procedure in Mode 1 Communication", 3GPP TSG RAN WG1 Meeting #78, R1-143181, Aug. 18-22, 2014.
Nokia Corporation, Nokia Networks: "Timing and resource pools of Type 213 discovery signals", 3GPP TSG-RAN WG1 Meeting #78, R1-143248, Aug. 18-22, 2014.
U.S. Department of Commerce: "Public safety concerns and proposals on D2D resource allocation", 3GPP TSG-RAN WG1 #78, R1-143259, Aug. 18-22, 2014.
Sony: "Resource allocations for Type-1 D2D discovery", 3GPP TSG RAN WG1 #78, R1-143278, Aug. 18-22, 2014.
MCC Support: "Final Report of 3GPP TSG RAN WG1 #77 v1.1.0 (Seoul, South Korea, May 19-23, 2014)", 3GPP TSG RAN WG1 Meeting #78, R1-143404, Aug. 18-22, 2014.
Alcatel-Lucent: "Chairman's Notes of Agenda Item 7.21 LTE Device to Device Proximity Services", R1-144487, 3GPP TSG RAN WG1 Meeting #78bis, Ljubljana, Slovenia, Oct. 6-10, 2014.
LG Electronics: "Discussion on resource allocation for D2D synchronization", R1-143188, 3GPP TSG RAN WG1 Meeting #78, Dresden, Germany, Aug. 18-22, 2014.
ZTE: "Resource allocation for synchronization signal and channel", R1-142235, 3GPP TSG RAN WG1 Meeting #77, Seoul, Korea, May 19-23, 2014.
LG Electronics: "Discussion on resource allocation for D2DSS", R1-143532, 3GPP TSG RAN WG1 Meeting #78, Dresden, Germany, Aug. 18-22, 2014.
Qualcomm: "Overview of D2D", R4-145188, 3GPP TSG RAN WG4 Meeting #72, Dresden, Germany, Aug. 18-22, 2014.
ZTE: "Discussion on Synchronization for Discovery", R1-143143, 3GPP TSG RAN WG1 Meeting #78, Dresden, Germany, Aug. 18-22, 2014.

* cited by examiner

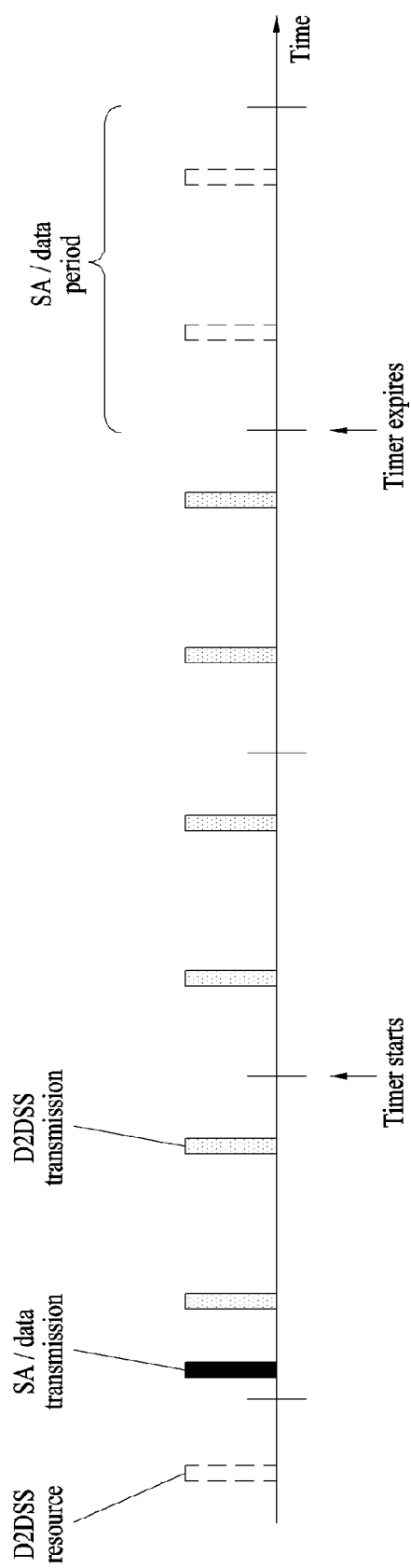

METHOD FOR TRANSMITTING D2D SIGNAL AND TERMINAL THEREFOR

This application is a 35 USC § 371 National Stage entry of International Application No. PCT/KR2015/010126 filed on Sep. 24, 2015, and claims priority to U.S. Provisional Application Nos. 62/054,950 filed Sep. 24, 2014; 62/061,128 filed Oct. 7, 2014; 62/061,690 filed Oct. 8, 2014; 62/061,612 filed Oct. 8, 2014; 62/061,706 filed Oct. 9, 2014; 62/076,470 filed Nov. 6, 2014; 62/080,247 filed Nov. 14, 2014; 62/086,173 filed Dec. 1, 2014; 62/108,527 filed Jan. 27, 2015; 62/109,636 filed Jan. 30, 2015; 62/149,518 filed Apr. 17, 2015; 62/149,690 filed Apr. 20, 2015 and 62/165,222 filed May 22, 2015, all of which are hereby incorporated by reference in their entireties as if fully set forth herein.

TECHNICAL FIELD

The present invention relates to a wireless communication system, and more particularly, to a method for transmitting a Device-to-Device (D2D) signal and a terminal for the same.

BACKGROUND ART

Recently, with the spread of smartphones and tablet PCs and activation of high-capacity multimedia communication, mobile traffic has significantly increased. Mobile traffic is expected to double every year. Since most mobile traffic is transmitted through a base station (BS), communication service operators are being confronted with serious network load. To process increasing traffic, communication operators have installed networks and accelerated commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between contiguous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to ability thereof to cope with traffic overload by distributing traffic converging upon the BS. For this reason, a standardization institute such as 3rd generation partnership (3GPP) or institute of electrical and electronics engineers (IEEE) is establishing D2D communication standards based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

DISCLOSURE

Technical Problem

An object of the present invention devised to solve the problem lies in an efficient method for transmitting a D2D synchronization signal (D2DSS) in D2D communication.

Technical Solution

The object of the present invention can be achieved by providing a a method for transmitting a synchronization signal for Device-to-Device (D2D) discovery by a terminal, including receiving, from a base station, a signal indicating a first behavior or a second behavior for transmission of the synchronization signal of the terminal, and transmitting the synchronization signal based on the received signal, wherein, when the received signal indicates the first behavior and the first subframe of a discovery pool corresponds to a resource for the synchronization signal, the synchronization signal is transmitted in the first subframe, wherein, the received signal indicates the first behavior and the first subframe does not correspond to the resource for the synchronization signal, the synchronization signal is transmitted on a foregoing resource for the synchronization signal nearest to the first subframe, wherein, when the received signal indicates the second behavior, the synchronization signal is transmitted at a predetermined period within the discovery pool.

In another aspect of the present invention, provided herein is a terminal for transmitting a synchronization signal for Device-to-Device (D2D) communication, including a transceiver configured to transmit and receive a radio signal, and a processor configured to control the transceiver, wherein the processor is configured to receive, from a base station, a signal indicating a first behavior or a second behavior for transmission of the synchronization signal of the terminal, and transmit the synchronization signal based on the received signal, wherein, when the received signal indicates the first behavior and the first subframe of a discovery pool corresponds to a resource for the synchronization signal, the synchronization signal is transmitted in the first subframe, wherein, the received signal indicates the first behavior and the first subframe does not correspond to the resource for the synchronization signal, the synchronization signal is transmitted on a foregoing resource for the synchronization signal nearest to the first subframe, wherein, when the received signal indicates the second behavior, the synchronization signal is transmitted at a predetermined period within the discovery pool.

Advantageous Effects

According to embodiments of the present invention, D2D communication quality may be improved.

According to embodiments of the present invention, an efficient method for transmitting a D2DSS may be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings;

FIG. 14A illustrates an example of D2DSS transmission according to Option 1;

MODE FOR INVENTION

Figure 1:
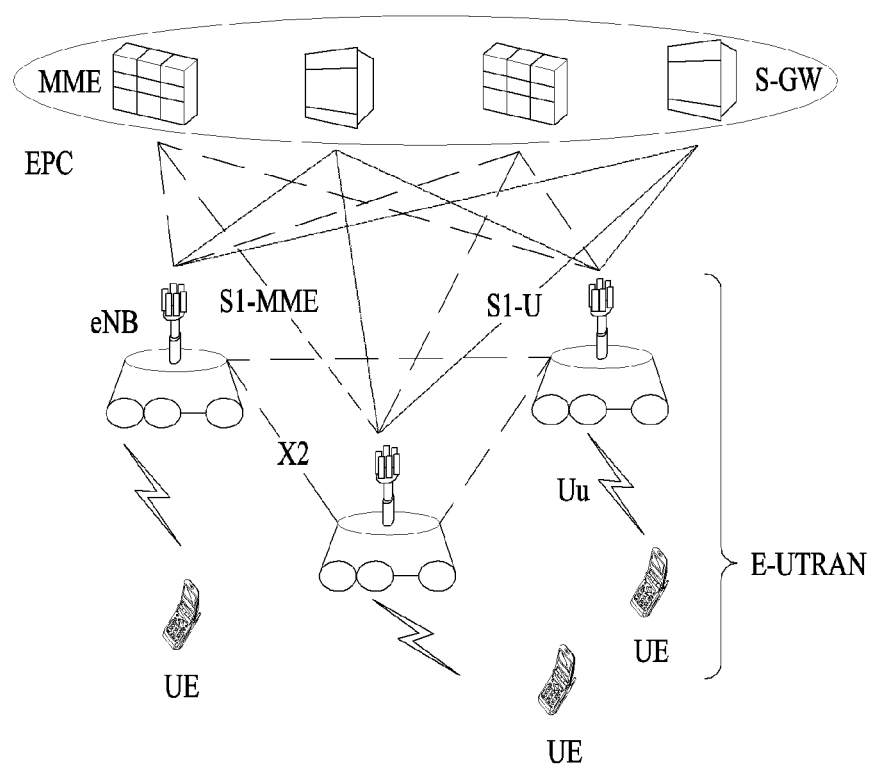
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), 1-DMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from a UMTS system. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
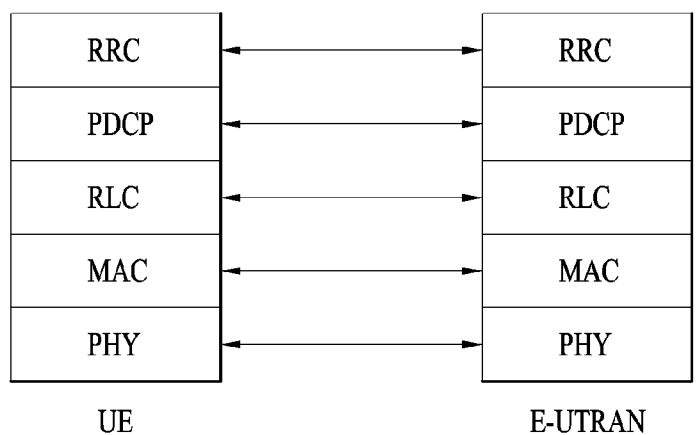
FIG. 2 illustrates a control plane of a radio protocol.
Figure 3:
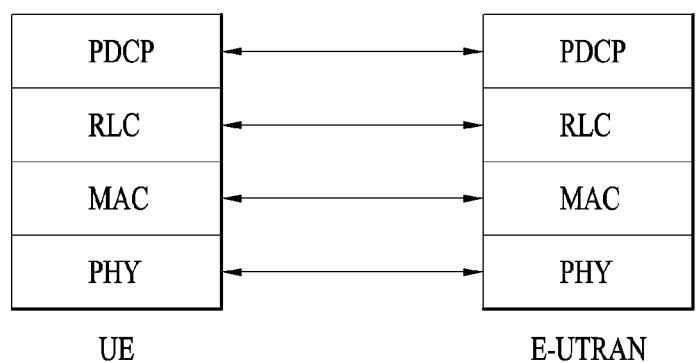
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Medium Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of an Open System Interconnection (OSI) reference model widely known in the field of communication systems. Those layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Medium Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
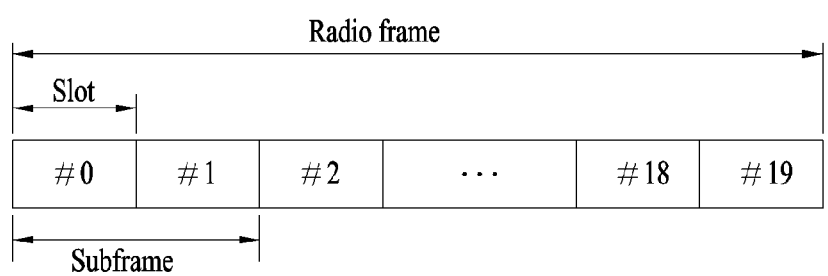
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
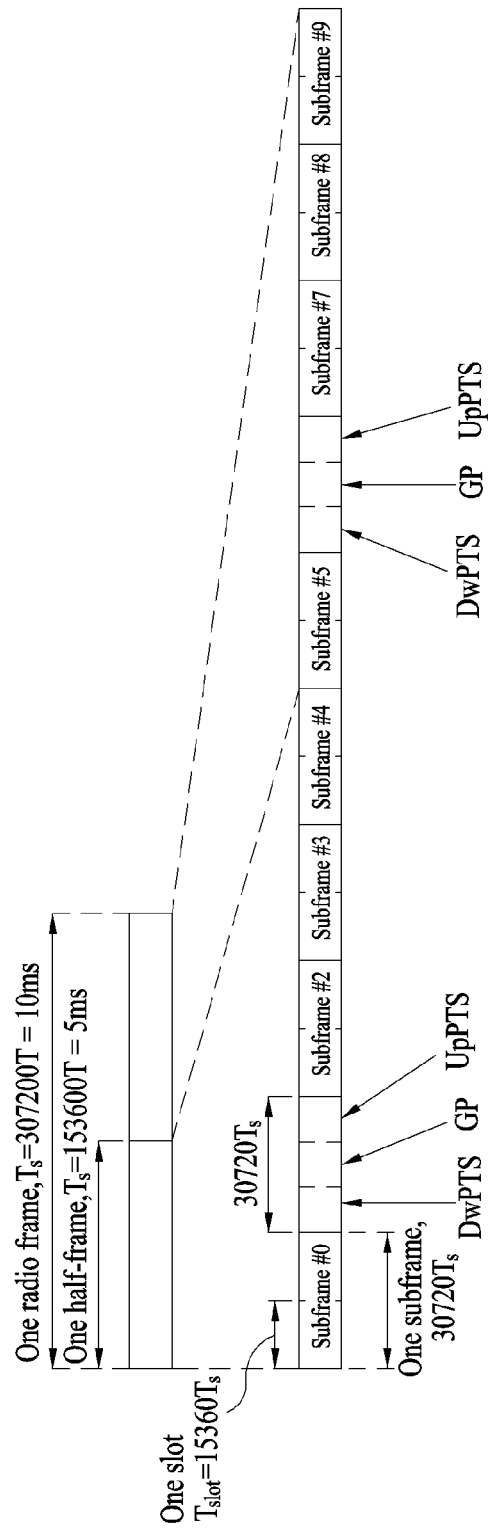
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
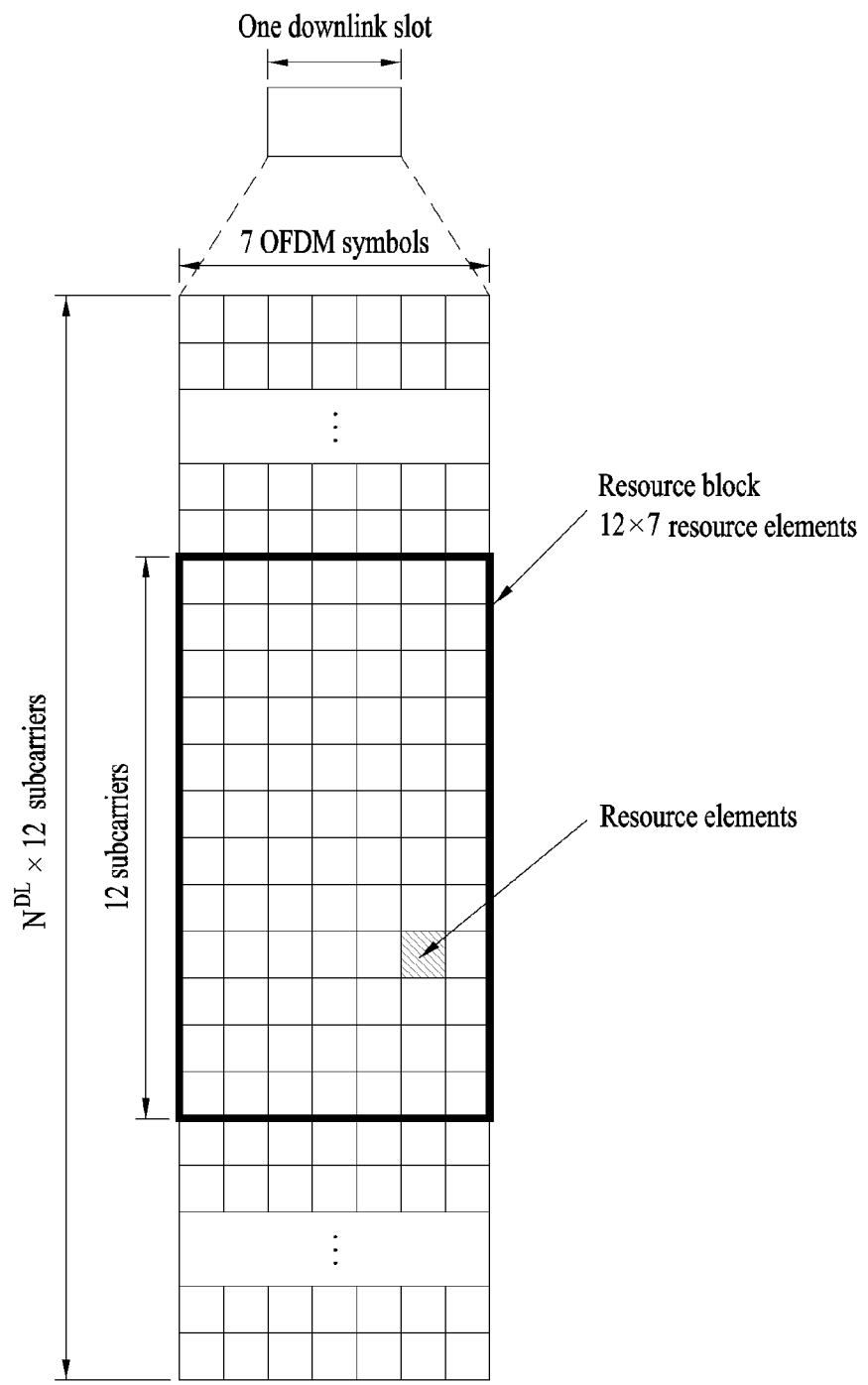
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 7:
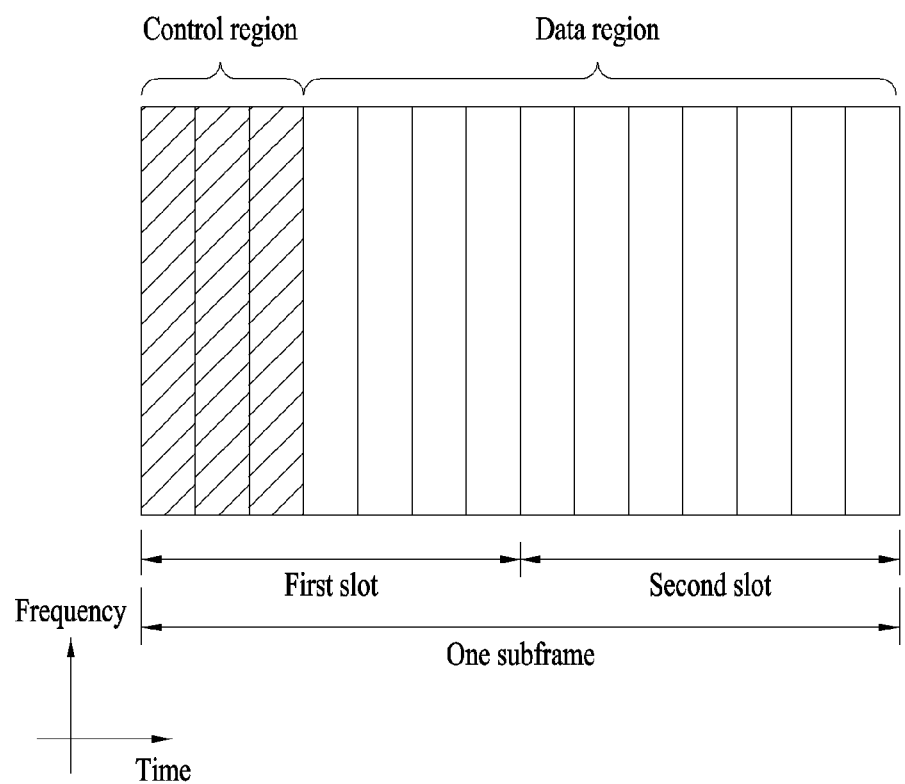
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
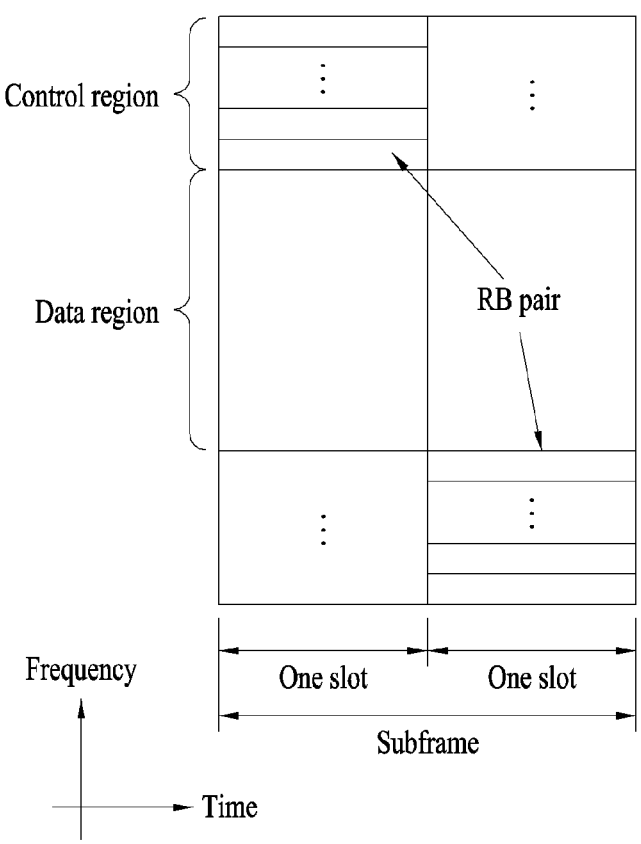
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary. For example, in a D2D communication system, UEs may exchange data with each other using an uplink data resource or a corresponding data resource.

Various embodiments related to D2D communication (also called D2D direct communication) will hereinafter be given. Although D2D communication will hereinafter be described based on 3GPP LTE/LTE-A, it should be noted that D2D communication may also be applied to other communication systems (IEEE 802.16, WiMAX etc.)

D2D Communication Type

D2D communication may be classified into Network coordinated D2D communication and Autonomous D2D communication according to whether D2D communication is executed under network control. The network coordinated D2D communication may be classified into a first type (Data only in D2D) in which D2D communication is used to transmit only data and a second type (Connection Control only in Network) in which the network performs only access control according to the degree of network intervention. For convenience of description, the first type will hereinafter be referred to as a Network Centralized D2D communication type, and the second type will hereinafter be referred to as a distributed D2D communication type.

In the Network Centralized D2D communication type, only data is exchanged between D2D UEs, and connection control between D2D UEs and radio resource allocation (grant message) may be carried out by the network. D2D UEs may transmit and receive data and specific control information using radio resources allocated by the network. For example, HARQ ACK/NACK feedback for data reception between D2D UEs, or Channel State Information (CSI) may not be directly exchanged between the D2D UEs, and may be transmitted to another D2D UE over the network. In more detail, if the network configures a D2D link between D2D UEs and allocates radio resources to the configured D2D link, a transmission D2D UE and a reception D2D UE may perform D2D communication using radio resources. In other words, in the network centralized D2D communication type, D2D communication between D2D UEs may be controlled by the network, and D2D UEs may perform D2D communication using radio resources allocated by the network.

The network in the distributed D2D communication type may perform a more limited role than a network in the network centralized D2D communication type. Although the network of the distributed D2D communication type performs access control between D2D UEs, radio resource allocation (grant message) between the D2D UEs may be autonomously occupied by competition of the D2D UEs without the help of the network. For example, HARQ ACK/NACK or CSI in association with data reception between D2D UEs may be directly exchanged between the D2D UEs without passing through the network.

As illustrated in the above example, D2D communication may be classified into network centralized D2D communication and distributed D2D communication according to the degree of D2D communication intervention of the network. In this case, the network centralized D2D communication type and the distributed D2D communication type are characterized in that D2D access control is performed by the network.

In more detail, the network for use in the network coordinated D2D communication type may configure a D2D link between the D2D UEs scheduled to perform D2D communication, such that connection between the D2D UEs may be constructed. When configuring a D2D link between the D2D UEs, the network may assign a physical D2D link identifier (LID) to the configured D2D link. When plural D2D links are present between the D2D UEs, the physical D2D link ID may be used as an ID for identifying each D2D link.

Unlike the network centralized and distributed D2D communication types, the autonomous D2D communication type may allow the D2D UEs to perform D2D communication freely without the help of the network. That is, unlike the network centralized and distributed D2D communication types, the autonomous D2D communication type may control the D2D UE to autonomously perform access control and radio resource occupancy. If necessary, the network may also provide the D2D UE with D2D channel information capable of being used in the corresponding cell.

D2D Communication Link Configuration

For convenience of description, a UE, which is scheduled to perform or may perform D2D communication including D2D direct communication, will hereinafter be referred to as a D2D UE. If a transmitter and a receiver need to be distinguished from each other, a D2D UE, which is scheduled to transmit or may transmit data to another D2D UE using radio resources allocated to the D2D link during D2D communication, will hereinafter be referred to as a transmission (Tx) D2D UE, or another UE, which is scheduled to receive or may receive data from the Tx D2D UE, will hereinafter be referred to as a reception (Rx) D2D UE. If a plurality of D2D UEs, which is scheduled to receive or may receive data from the Tx D2D UE, is used, the Rx D2D UEs may also be identified by ordinal numerals such as "$1^{st}$ to $N^{th}$". For convenience of description, either a base station (BS) for controlling access between the D2D UEs or allocating radio resources to the D2D link or a node (such as a D2D server, and an access/session management server) located at a network stage will hereinafter be referred to as a network.

D2D UE scheduled to perform D2D communication needs to pre-recognize the presence or absence of neighbor D2D UEs capable of transmitting and receiving data so as to transmit data to another D2D UE through D2D communication. For this purpose, the D2D UE may perform D2D peer discovery. The D2D UE may perform D2D discovery within a discovery interval, and all D2D UEs may share the discovery interval. The D2D UE may monitor logical channels of a discovery region within the discovery interval, and may thus receive D2D discovery signals from other D2D UEs. D2D UEs having received a transmission (Tx) signal from another D2D UE may construct the list of neighbor D2D UEs using a reception (Rx) signal. In addition, D2D UE may broadcast its own information (i.e., ID) within the discovery interval, and other D2D UEs may receive the broadcast D2D discovery signal, such that the presence of the corresponding D2D UE in a D2D communication available range may be recognized.

Information for the D2D discovery may be broadcasted periodically. In addition, a timing of such a broadcast may be determined by a protocol in advance and then informed D2D UEs. The D2D UE may transmit/broadcast a signal during a part of the discovery interval and each D2D UE may monitor signals potentially transmitted by other D2D UEs during the rest of the D2D discovery interval.

For instance, the D2D discovery signal may be a beacon signal. In addition, D2D discovery intervals may include a multitude of symbols (e.g., OFDM symbols). The D2D UE may transmit/broadcast the D2D discovery signal in a manner of selecting at least one symbol in the D2D discovery interval. Moreover, the D2D may transmit a signal corresponding to one tone existing in the symbol selected by the D2D UE.

After the D2D UEs discover each other through the D2D discovery process, the D2D UEs may establish a connection establishment process and transmit traffics to other D2D UEs.

Figure 9:
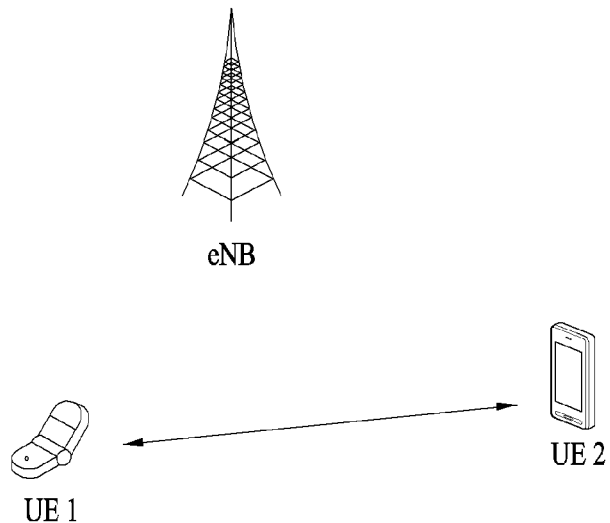
FIG. 9 shows a simplified D2D communication network.

FIG. 9 schematically shows a D2D communication network.

In FIG. 9, D2D communication is performed between UEs (UE1 and UE2) supporting the D2D communication. In general, a UE (user equipment) means a user terminal. However, when a network equipment such as an eNB (evolved Node B) transceives signals according to a communication scheme between UEs (UE1 and UE2), the eNB may also be regarded as a kind of the UE.

The UE1 may be configured to select a resource unit corresponding to specific resources in a resource pool indicating a set of resources and transmit a D2D signal using the corresponding resource unit. The UE2 corresponding to a receiving UE may receive a configuration of the resource pool used by the UE1 to transmit the signal and detect the signal of the UE1 in the corresponding resource pool. For example, when the UE1 is within a coverage of a BS, the BS may inform the resource pool. On the other hand, for example, when the UE1 is out of the coverage of the BS, another UE may inform the UE1 of the resource pool or the UE1 may determine the resource pool based on predetermined resources. Generally, the resource pool may include a plurality of resource units and each UE may select one or a plurality of resource units to transmit its D2D signal.

Figure 10:
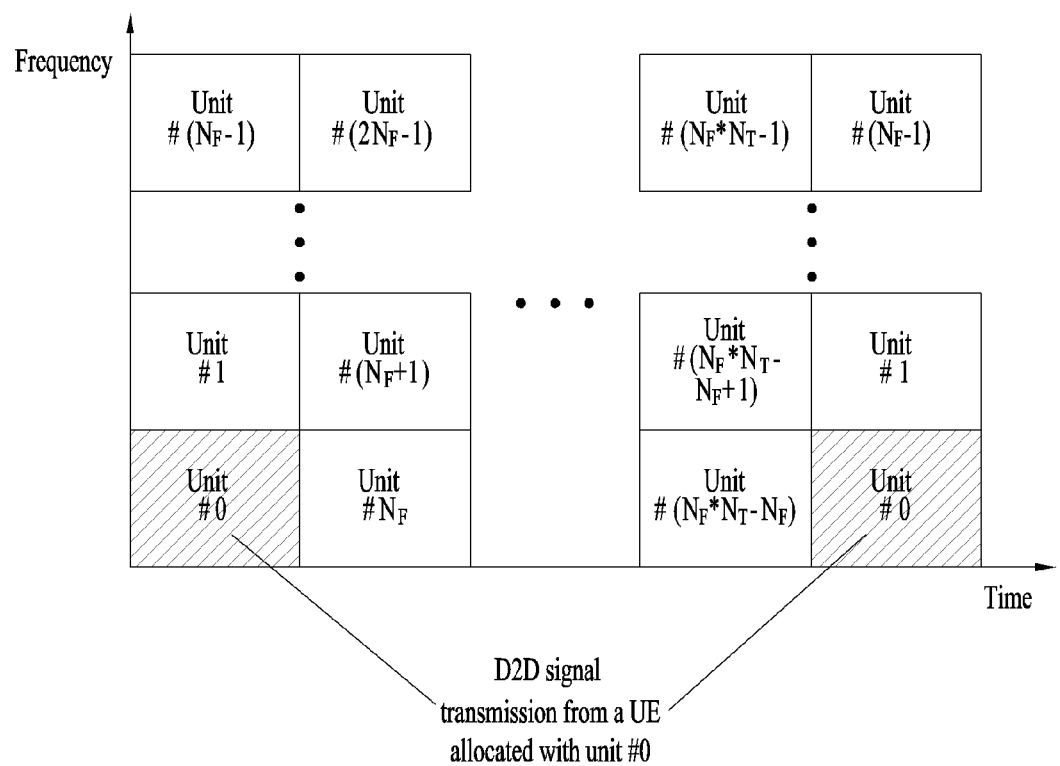
FIG. 10 illustrates configuration of a resource unit according to an embodiment.

FIG. 10 shows an example of a configuration of a resource unit.

In FIG. 10, a vertical axis means frequency resources and a horizontal axis means time resources. In addition, radio resources are divided into $N_T$ resources in the time axis, thereby configuring $N_T$ subframes. In addition, frequency resources are divided into $N_F$ resources in a single subframe, whereby the single subframe may include $N_T$ symbols. Thus, a total of ($N_F * N_T$) resource units may constitute a resource pool.

In an embodiment of FIG. 10, since a D2D transmission resource allocated to unit #0 is repeated every $N_T$ subframes, the resource pool may be repeated with a period of $N_T$ subframes. As shown in FIG. 10, a specific resource unit may be repeated periodically. In addition, to obtain a diversity effect in a time dimension or a frequency dimension, an index of a physical resource unit to which a single logical resource unit is mapped may be changed according to a predetermined pattern. For instance, the logical resource unit may be hopped on the time and/or frequency axes according to the pattern predetermined on the actual physical resource unit. In FIG. 10, the resource pool may mean a set of resource units that may be used by a UE intending to transmit a D2D signal to transmit the D2D signal.

The aforementioned resource pool may be subdivided into several types. For instance, the resource pool may be classified according to a content of the D2D signal transmitted in each resource pool. For example, the content of the D2D signal may be classified as follows and a separate resource pool may be configured for each content.

Scheduling assignment (SA): The SA (or SA information) may include a location of resources used by each transmitting UE for transmitting a following D2D data channel, MCS (modulation and coding scheme) necessary for demodulation of other data channels, and/or a MIMO (multiple input multiple output) transmission scheme. In addition, the SA information may include an identifier of a target user equipment to which the transmitting UE intends to transmit data. A signal containing the SA information may be multiplexed and transmitted with D2D data on the same resource unit. In this case, an SA resource pool may mean a resource pool in which the SA is multiplexed and transmitted with the D2D data.

D2D data channel: The D2D data channel may mean a resource pool used by the transmitting UE for transmitting user data by utilizing the resources designated through the SA. In case that the D2D data channel is multiplexed and transmitted with D2D resource data on the same resource unit, only the D2D data channel except the SA information may be transmitted in the resource pool for the D2D data channel. In other words, resource elements for transmitting the SA information on each individual resource unit in the SA resource pool may be used for transmitting the D2D data in the resource pool for the D2D data channel.

Discovery message: A discovery message resource pool may mean a resource pool for transmitting the discovery message. The transmitting UE may transmit the discovery message containing information such as its ID (identifier) for the purpose of enabling neighboring UEs to discover the corresponding transmitting UE.

As described above, the D2D resource pool may be classified according to the content of the D2D signal. However, although D2D signals have the same content, different resource pools may be used according to transmitting and receiving properties of the D2D signals. For instance, even in the case of the same D2D data channel or discovery message, different resource pools may be used according to a scheme for determining a transmission timing of the D2D signal (e.g., the D2D signal is transmitted at a reception time of a synchronization reference signal or at a time obtained by applying a timing advance to the reception time), a scheme for assigning a resource (e.g., an eNB designates a resource for transmitting each individual signal for each individual transmitting UE or each individual transmitting UE autonomously selects the resource for transmitting each individual signal from its resource pool), or a signal format (e.g., the number of symbols occupied by each D2D signal in a single subframe or the number of subframes used for transmitting a single D2D signal).

As mentioned in the foregoing description, a UE that intends to transmit data using the D2D communication may transmit its SA information by selecting appropriate resources from the SA resource pool. In addition, for instance, as reference for selecting the SA resource pool, resources not used by a different UE for SA information transmission and/or SA resources interconnected with resources in a subframe where data transmission is not expected after the SA information transmission by the different UE may be selected as the SA resource pool.

Moreover, the UE may select SA resources interconnected with data resources where a low level of interference is expected.

In this regard, the resource allocation method for D2D data channel transmission may be divided into two modes.

Mode 1 may mean a method in which a cell (or network) directly designates resources used for Scheduling Assignment (SA) and D2D data transmission to individual D2D transmitting UEs. In this mode, the cell may recognize a UE which transmits a D2D signal and resources that UE use to transmit a signal. However, since designating a D2D resource for every D2D signal transmission may cause excessive signaling overhead, the cell may allocate a plurality of SA and/or data transmission resources to the UE through one-time signaling.

Mode 2 may mean a method in which a cell (or network) indicates a specific SA and/or D2D data-related resource pool to a plurality of D2D transmitting UEs, and an individual D2D transmitting UE selects an appropriate resource and transmits SA and/or data. In this case, it is difficult for the cell to accurately identify a resource the UE uses for D2D transmission.

Meanwhile, the resource allocation method for discovery (DS) message transmission may be divided into two types.

Type 1 may refer to a DS procedure where a resource for transmitting a DS signal is allocated on a non-UE specific basis.

In addition, Type 2 may refer to a DS procedure where a UE-specific DS signal transmission resource is allocated. Type 2 may include Type 2A in which resources are allocated at the time of transmission of each specific DS signal and Type 2B in which resources for DS signals are semi-persistently allocated.

Figure 11:
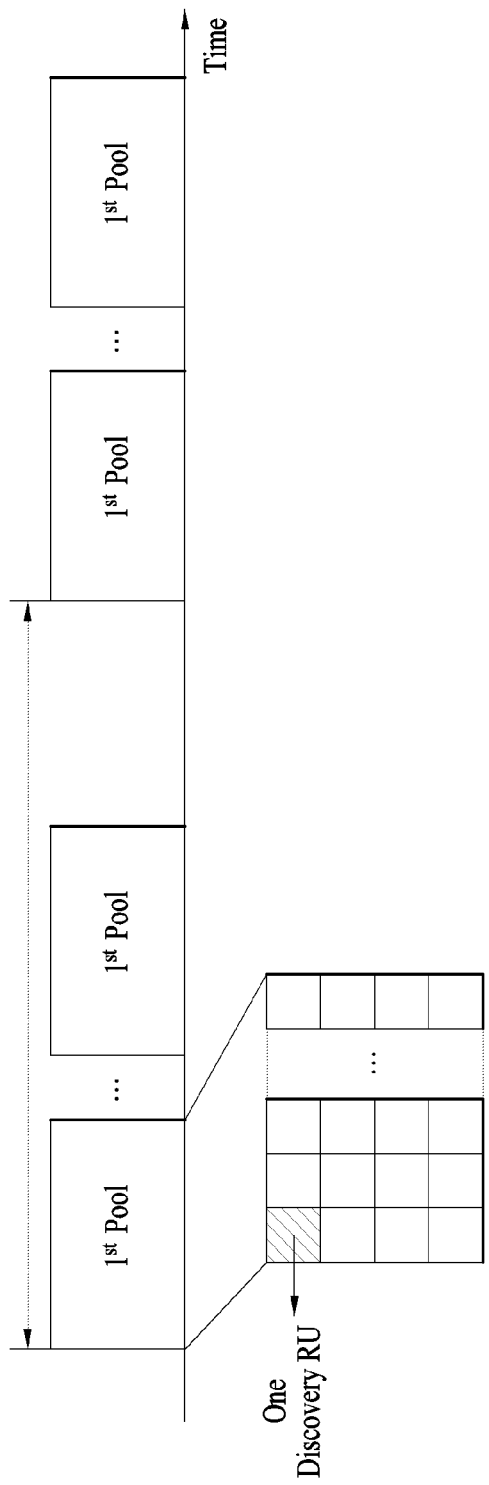
FIG. 11 illustrates a resource pool related to a periodic discovery message according to an example.

FIG. 11 illustrates a resource pool (e.g., discovery resource pool) related to a periodic discovery message according to one example.

In the example of FIG. 11, the period in which the discovery resource pool appears may be referred to as a discovery resource pool period. As shown in FIG. 11, one or more discovery resource pools may exist within the discovery resource pool period. For example, of the discovery resource pools within the discovery resource pool period, particular discovery resource pool(s) may be defined as discovery send/receive resource pool(s) associated with a serving cell, and the other (or remaining) discovery resource pool(s) may be defined as discovery receive resource pool(s) associated with a neighboring cell.

With reference to FIG. 10 and FIG. 11, the D2D communication related resource configuration/allocation has been described. In the following description, a UE transmitting a D2D signal may be referred to as a D2D transmitting UE (D2D TX UE), and a UE receiving a D2D signal may be referred to as a D2D receiving UE (D2D RX UE).

Meanwhile, the D2D UEs (D2D transmitting UE and D2D receiving UE) may use a D2DSS (D2D Synchronization Signal) to maintain/establish synchronization between the D2D UE and the eNB and/or synchronization between the D2D UEs. Transmission/reception of the D2DSS may be indicated by the eNB or performed according to a predetermined D2DSS configuration. When a specific D2DSS configuration is configured for a plurality of D2D resource pool configurations, or is shared among a plurality of D2D resource pool configurations, valid D2DSS resources of a specific D2D resource pool configuration may be configured or reconfigured. For example, valid D2DSS resources of a specific D2D resource pool configuration may refer to resources on which a D2D synchronization source actually performs D2DSS transmission or is very likely to perform D2DSS transmission (in relation to the specific D2D resource pool configuration). For example, the D2DSS configuration may mean (or include) D2DSS resource periodicity, D2DSS transmission periodicity, and/or D2D sequence information. For example, the D2D resource pool configuration may mean (or include) at least one of a scheduling assignment pool configuration, a data channel resource pool configuration, and a search resource pool configuration. For example, in the following embodiments, D2D communication may mean that a UE directly communicates with another UE through a radio channel. If network equipment such as a base station (eNB) transmits/receives a signal according to a communication scheme between UEs, it may also be regarded as a kind of UE.

Table 1 shows an example of the D2DSS transmission/reception method.

TABLE 1

| WORKING ASSUMPTION (RAN1#76BIS MEETING) |
| --- |
| A synchronization source transmits D2DSS periodically<br>D2DSS period is not smaller than 40 ms<br>FFS whether D2DSS period is configurable/pre-defined, e.g., depending on scenarios<br>AGREEMENT (RAN1#76BIS MEETING) |
| For out-of-coverage,<br>A UE can become a D2D Synchronization Source if received signal strength of all received D2DSS(s) by the UE are below X dBm.<br>FFS on details of how to compute the received signal strength of a D2DSS.<br>FFS for how long the received signal strength has to be below X dBm.<br>The value of X dBm is pre-configured.<br>The value of X can be infinite, i.e., every UE can become a D2D Synchronization Source.<br>Set of other possible values of X is FFS.<br>Other criteria under which a UE may become a D2D synchronization source are not precluded-FFS.<br>Any possible conditions under which a UE shall not become or shall cease to be a D2D synchronisation source are FFS.<br>For in-coverage,<br>A UE can become a D2D Synchronization Source at least if it is configured to do so by the eNB.<br>FFS whether any additional criteria have to be met before a UE that is configured to become a D2D synchronization source can become one.<br>FFS whether any special UE reporting is needed to assist the eNB.<br>FFS for other criteria, e.g. if the eNB has configured resources within which D2DSS may be transmitted.<br>Consider interference impact to cellular in such cases.<br>FFS whether UEs in coverage have to be RRC connected in order to transmit D2DSS.<br>Any possible conditions under which a UE shall not become or shall cease to be a D2D synchronisation source are FFS.<br>AGREEMENT (RAN1#76BIS MEETING) |
| For out-of-coverage UEs,<br>Synchronization resources that occur periodically are used for transmitting D2DSS.<br>FFS whether PD2DSCH (if supported) is transmitted.<br>Size of a synchronization resource is FFS.<br>It is fixed in specification.<br>Periodicity of synchronization resources is pre-configured.<br>Whenever a D2D Synchronization Source transmits on a synchronization resource,<br>it transmits at least D2DSS on the synchronization resource, and receives at least D2DSS on other synchronization resource(s) (which may or may not be pre-configured).<br>Which synchronization resource is used for transmission is FFS.<br>FFS: timing offset between transmit and receive resources.<br>FFS: possible mechanism to handle the case of other out-of-coverage UEs transmitting on the same synchronization resource as the UE is transmitting on.<br>WORKING ASSUMPTION (RAN1#76BIS MEETING): |
| For both in-coverage and out-of-coverage, a synchronization resource for D2DSS occupies the 6 central RBs of a sub-frame.<br>AGREEMENT (RAN1#77 MEETING) |
| D2DSS transmission configuration is the same between D2D discovery and D2D communication if NW supports both D2D communication and discovery<br>For Type 1 discovery,<br>For a cell, within a discovery period, the first sub-frame of the transmission pool can be used for transmitting the PD2DSS and SD2DSS by UEs transmitting discovery signals.<br>If Type 1 resource pool is configured using SIB then the PD2DSS and SD2DSS sequence transmitted is configured using SIB.<br>The same PD2DSS and SD2DSS sequences is used for D2D communication.<br>Else sequence transmitted can be configured using dedicated RRC signaling.<br>For Type 2B discovery,<br>eNodeB can instruct UE to transmit PD2DSS and SD2DSS.<br>For both Type 1 and Type 2B the reception pool information contains information (implicitly or explicitly) on which time resources and sequences UE should monitor for PD2DSS and SD2DSS if transmission of PD2DSS and SD2DSS is configured.<br>FFS: If all discovery UEs transmit D2DSS. |

For example, if the D2DSS configuration is established independently (or differently) for each D2D resource pool configuration, complexity associated with the D2DSS transmission/reception operation of the D2D UE (or overhead associated with the D2D resources) may be increased in proportion to the number of pre-established or signaled D2D resource pool configurations. Thus, a specific D2DSS configuration may be established for multiple D2D resource pool configurations, or may be shared between multiple D2D resource pool configurations.

For example, a specific (one) D2D D2DSS configuration may be shared between D2D communication and D2D discovery according to the rule stating that "D2DSS transmission configuration is the same between D2D discovery and D2D communication if network supports both D2D communication and discovery". Accordingly, a specific D2D configuration may support multiple D2D resource pool configurations simultaneously having independent (or different) periodicities and subframe offset configurations. In addition, for example, a plurality of D2D resource pool configurations among which (one) specific D2DSS configuration is established or shared may be a mixture of (serving cell/neighbor cell) D2D communication resource pool configurations and (serving cell/neighbor cell) D2D discovery resource pool configurations, a single configuration of (serving cell/neighbor cell) D2D communication resource pool configurations, or a single configuration of (serving cell/neighbor cell) D2D discovery resource pool configurations. Some or all of the D2D synchronization sources associated with each D2D resource pool configuration, for example, may differ among the D2D resource pool configurations.

As described above, if a specific D2DSS configuration is established for multiple D2D resource pool configurations or is shared among multiple D2D resource pool configurations, the valid D2DSS resources of a D2D resource pool configuration need to be reconfigured. For example, valid D2DSS resources of a specific D2D resource pool configuration may refer to resources on which the D2D synchronization source actually performs or is very likely to perform D2DSS transmission (in relation to the specific D2D resource pool configuration). In this regard, D2D communication transmission and D2D discovery transmission may be performed with a different periodicity for each D2D resource pool configuration. This is because the D2D communication resource pool and/or the D2D discovery resource pool may appear with a different periodicity for each D2D resource pool configuration. Thus, it may be inefficient to perform D2DSS transmission with the same periodicity for different D2D resource pool configurations.

For example, if a D2DSS is sent to a D2D UE that performs only transmission related to D2D discovery with a shorter periodicity than the D2D discovery period (for example, a D2DSS transmission periodicity related to D2D communication), this may lead to inefficient consumption of the battery of the D2D UE. For example, an Out-of-Coverage (OOC) D2D UE performing a D2D communication transmission operation may transmit a D2DSS with a pre-configured or signaled short (or minimum) period (which may be referred to as, for example, D2DSS_OOCP) in order to maintain a reliable D2D communication link. For example, for a D2D UE that performs only a D2D discovery transmission operation based on a D2D discovery cycle having a period longer than D2DSS_OOCP, it may be inefficient for the D2D UE to perform D2DSS transmission based on D2DSS_OOCP which has a short period. For example, the D2D discovery period may be set to one of 320 ms, 640 ms, 1,280 ms, 2,560 ms, 5,120 ms, and 10,240 ms. Therefore, it may be inefficient to set the D2DSS transmissions to be performed in the same period among multiple D2D resource pool configurations that are established according to different (or independent) periodicities and sub-frame offsets without considering the periodicity of each D2D resource pool configuration and the setting of the subframe offset. Therefore, in order to address this issue, valid D2DSS resources of a specific D2D resource pool configuration may be configured as follows.

Embodiment 1

If a specific (one) D2DSS configuration is established for multiple D2D resource pool configurations or is shared among the multiple D2D resource pool configurations, the valid D2DSS resources of a specific D2D resource pool configuration may be configured by a D2DSS subframe nearest to the starting point of the D2D resource pool among the entire D2DSS subframes configured by the specific (one) D2DSS configuration before (or at) the starting point.

For example, the method described above may mean that the D2D synchronization source associated with a specific D2D resource pool configuration transmits or is likely to transmit a D2DSS (related to the next nearest D2D resource pool) on the corresponding valid D2D subframe. In addition, the above-described method is applied/applicable only for transmission of a D2DSS related to a D2D discovery resource pool configuration, for example, when a specific (one) D2DSS configuration is set up for multiple D2D resource pool configurations or shared among the multiple D2D resource pool configurations. Further, the method described above may be applied only if the specific (one) D2DSS configuration described above is shared between D2D communication and D2D discovery in relation to Table 1.

Figure 12:
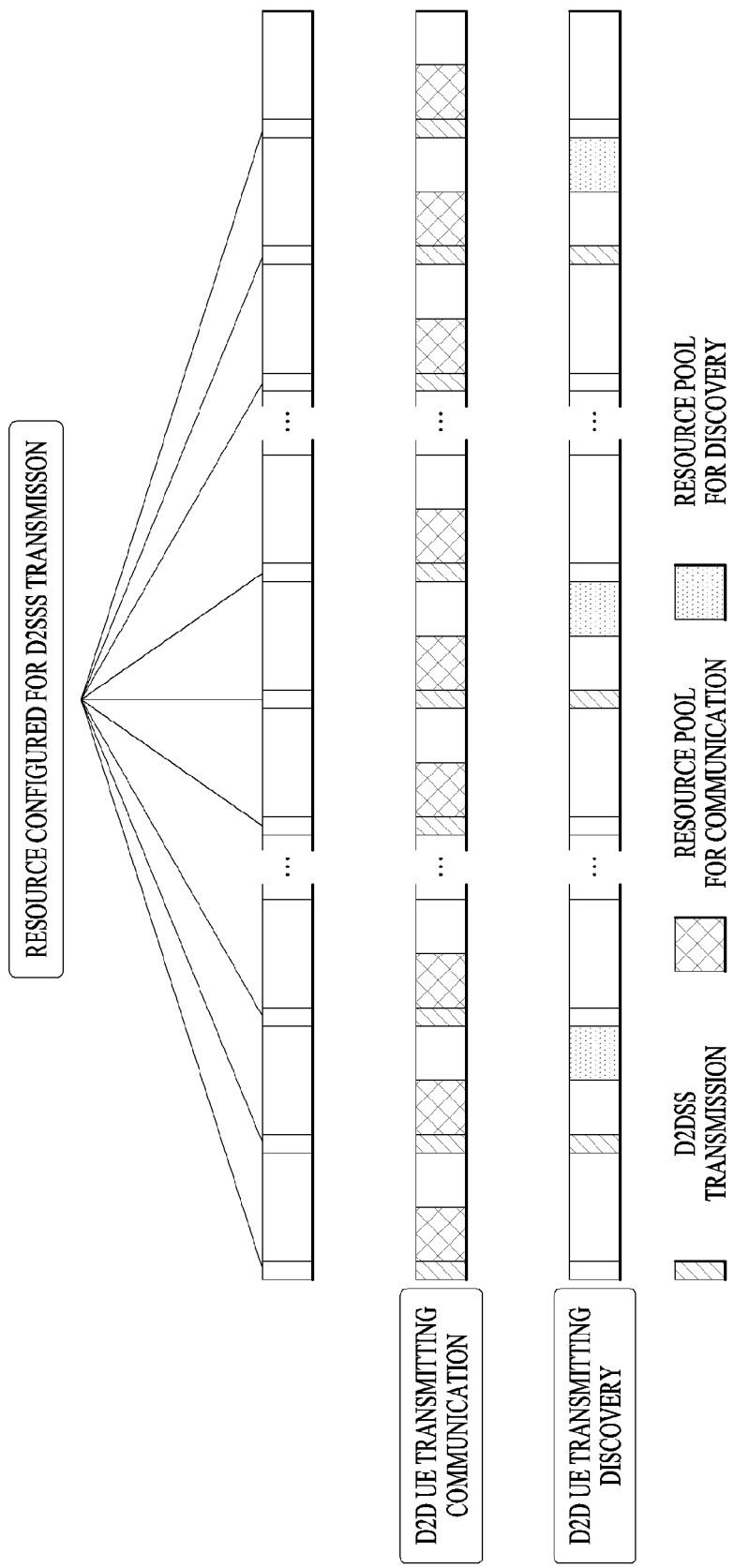
FIG. 12 illustrates configuration of a D2DSS transmission resource according to an example.

FIG. 12 illustrates configuration of a D2DSS transmission resource according to an example.

In FIG. 12, the rule stating that "D2DSS transmission configuration is the same between D2D discovery and D2D communication if network supports both D2D communication and discovery" is applied in relation to Table 1. For example, FIG. 12 may represent a case where one D2DSS configuration is shared between the D2D communication resource pool configuration and the D2D discovery resource pool configuration. In FIG. 12, the D2D UE performing D2D communication transmission and the D2D UE performing D2D discovery transmission have the same D2DSS transmission resource configuration. In reality, however, not all subframes for transmitting the D2DSS are shared. As shown in FIG. 12, the D2D UE performing only D2D discovery transmission (D2D UE transmitting discovery) transmits a D2DSS related to the D2D discovery resource pool configuration only in some valid D2DSS subframes (re-)selected according to Embodiment 1 among all D2DSS subframes configured by the D2DSS configuration.

For example, as another example, if a specific (one) D2DSS configuration is established for multiple D2D resource pool configurations, the valid D2DSS resources of the specific D2D resource pool configuration may be configured by a D2DSS subframe nearest to the starting point (which may be referred to as, for example, S-POINT) of the D2D resource pool among all D2DSS subframes configured by the specific (one) D2DSS configuration after (or at) the S-POINT, a D2DSS subframe nearest to the S-POINT of the D2D resource pool (for example, in the time domain and/or the frequency domain), or a D2DSS subframe (or the first D2DSS subframe) at the earliest (or latest) point in time among the D2DSS subframes within a predefined range of the D2D resource pool. Here, the predefined range of the D2D resource pool may mean a range from a subframe obtained by subtracting a predetermined window size from the S-POINT to the S-POINT, a range from the S-POINT to a subframe obtained by adding the predetermined window size to the S-POINT, or a range from the subframe obtained by subtracting the predetermined window size from the S-POINT to the subframe obtained by adding the predetermined window size to the S-POINT.

Meanwhile, a discovery UE (or a UE performing only discovery) of Release 12 transmits the D2DSS according to the following rule. For example, a rule may be defined such that transmission of D2DSS is performed only in a case where there is no collision with transmission of the WAN (Wide Area Network) uplink of the UE, a case where the UE (actually) performs discovery transmission on the discovery pool (or intends to perform discovery transmission on the discovery pool), a case where the eNB indicates start of D2DSS transmission (through dedicated RRC signaling or SIB signaling) (in a Radio Resource Control (RRC) connected state), a case where the Reference Signal Received Power (RSRP) of the discovery UE (or the UE performing only discovery) is lower than an RSRP set in relation to the grant (or start) of discovery D2DSS transmission (through dedicated RRC signaling or SIB signaling), and/or a case where the eNB does not instruct interruption of discovery D2DSS transmission (through dedicated RRC signaling or SIB signaling).

In addition, the discovery UE may transmit the D2DSS according to the rule of Table 2 below.

out-of-coverage and/or partial coverage scenarios). For example, the number of times of transmission of the discovery D2DSS is limited to once per discovery pool period based on the Rel-12 behavior. Therefore, it is difficult to sufficiently provide a stable (or highly reliable) synchronization to the out-of-coverage discovery UE (by the in-coverage UE). Therefore, the PS discovery UE (or Release 13 discovery UE) may perform transmission of D2DSS according to the following rule. In the following description, SideLink Synchronization Signal (SLSS) may have the same meaning as D2DSS. In addition, for example, the PS discovery UE (or Release 13 discovery UE) may be configured to follow only one of Behavior 1 and Behavior 2, which will be described below, it may be instructed through dedicated RRC signaling (or SIB signaling) that one of Behavior 1 and Behavior 2 should be followed. In addition, for example, the X parameter and/or Y parameter related to Behavior 2, which will be described later, may be set through separate signaling (RRC or SIB signaling) or may be a predetermined value. For example, of the X and Y parameters related to Behavior 2, only the X parameter may be defined. This case may be construed as meaning that additional D2DSS transmissions are configured (or instructed/allowed) only before D2DSS transmission on subframe N determined based on Behavior 1. For example, a rule may be defined that Behavior 1 or Behavior 2 shall be performed only in a case where the UE performing the discovery transmission is in in-coverage (or out-of-coverage), a case where a UE expects discovery reception of the UE in in-coverage (or out-of-coverage) and performs discovery transmission, and/or a case where a UE having (D2D) relay-capability or (D2D) communication-availability performs discovery transmission. Behavior 1 and Behavior 2 are as described in Table 3.

TABLE 2

"For a discovery UE, for each discovery pool, the UE shall transmit D2DSS in the first subframe of the discovery pool if this subframe is in the D2DSS resource, or otherwise in the latest subframe of the D2DSS resource before the start of the discovery pool (hereinafter, referred to as "Rel-12 Behaviour."

However, the Rel-12 behavior of Table 2 may be unsuitable for public safety (PS) discovery (operating in the

TABLE 3

A Rel-13 UE transmitting Type 1 discovery follows one of the following two SLSS transmission behaviors.
Behavior 1 (Rel-12 behavior): The UE in each discovery period transmits SLSS in subframe n determined by Rel-12 behavior.
Behavior 2: The UE in each discovery period transmits SLSS in subframes $n - 40*X$, $n - 40*(X - 1), \ldots, n, n + 40, \ldots, n + 40*Y$ where subframe n is determined by Rel-12 behavior.
The UE also transmits PSBCH.
X and Y are FFS under the condition that at least one of them is non-zero. It is not precluded to transmit SLSS every 40 ms.
FFS when the UE follows each behavior.

Figure 13A:
FIG. 13A illustrates an example of D2DSS transmission according to Behavior 1.
Figure 13B:
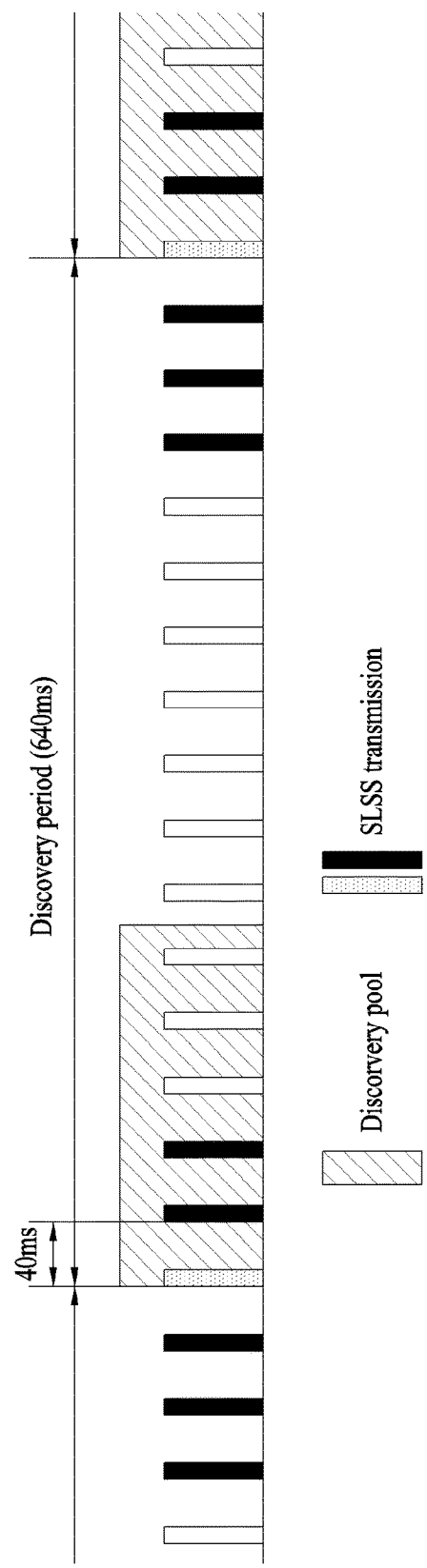
FIG. 13B illustrates an example of D2DSS transmission according to Behavior 2.

FIGS. 13A and 13B illustrate an example of SLSS transmission according to Behavior 1 and Behavior 2, respectively.

In FIGS. 13A and 13B, the discovery period is 640 ms. In FIG. 13A, an example of transmission of the SLSS according to Behavior 1 is shown. That is, transmission of the SLSS is performed in the first subframe of the discovery pool (i.e., the subframe determined by the Rel-12 behavior). In FIG. 13B, an example of transmission of the SLSS according to Behavior 2 is shown. If the X parameter is 3 and the Y parameter is 2, 3 SLSS transmissions may be performed at 40 ms intervals before the subframe determined by the Rel-12 behavior, and 2 SLSS transmissions may be performed at 40 ms intervals after the determined subframe.

Embodiment 2

When a specific (one) D2DSS configuration is established for multiple D2D resource pool configurations or shared among multiple D2D resource pool configurations (in the present invention), the D2D UE (or D2D synchronization source) may receive indication of D2DSS transmission related to a specific D2D resource pool configuration (from the eNB) (e.g., from an access network UE) to a D2DSS transmission associated with a specific D2D resource pool configuration (from a base station) via predefined signaling (dedicated RRC signaling) (in the case of, for example, the in-network UE), or may perform D2DSS transmission (in the case of, for example, the out-network UE). As a more specific example, a rule may be defined such that the D2D UE performs D2DSS transmission on the corresponding D2DSS subframe only if a condition that a D2DSS subframe should be configured by a specific (one) D2DSS configuration is satisfied. For example, if the D2DSS subframe is configured by a specific D2DSS configuration (when the D2D UE is instructed to transmit a D2DSS through (dedicated) signaling, or a predefined (or signaled) condition is satisfied), the D2D UE may perform D2DSS transmission. Therefore, for example, even when the subframe is not a valid D2DSS subframe of a specific D2D resource pool configuration (re-)established according to Embodiment 1 described above, the D2D UE may transmit the D2DSS (if D2DSS transmission is indicated to the D2D UE through (dedicated) signaling, or a predefined (or signaled) condition is met). For example, application of this method may be interpreted as meaning that D2DSS transmission indication information (and/or D2DSS sequence information) based on (dedicated (RRC)) signaling is prioritized over other (SIB-based) D2DSS related information. In addition, the UE may receive D2DSS sequence information (to be used) as well as the D2DSS transmission indication information through (dedicated (RRC)) signaling. In addition, the D2D UE receiving the D2DSS transmission-related (dedicated (RRC)) signaling may be, for example, an in-coverage (IC) D2D UE (which performs a type 2B discovery transmission operation). For example, a rule may be defined such that, when the D2D UE receives D2DSS resource information and/or D2DSS sequence information via (dedicated (RRC)) signaling, the D2D UE (implicitly) transmits a D2DSS. For example, a rule may be defined such that when a specific (one) D2DSS configuration is established for multiple D2D resource pool configurations, the D2D UE (or D2D synchronization source) performs the corresponding D2DSS transmission regardless of whether the subframe is a D2DSS subframe configured by the specific (one) D2DSS configuration (for example, at a subsequent specific point in time according to a predefined rule) if it is instructed to transmit a D2DSS related to a specific D2D resource pool configuration (by the eNB).

Embodiment 3

For example, when Embodiment 1 and/or Embodiment 2 described above are applied, the number of D2DSS transmissions per D2DSS subframe may not be constant. In this case, D2DSS (RX) power fluctuation may occur (in the time domain). The power fluctuation phenomenon may lead to an incorrect determination in an OOC UE, for example, when the OOC D2D UE determines whether to operate as a D2D synchronization source in consideration of the D2DSS receive power.

In order to address the above-described issue, a rule may be defined such that D2DSS receive power measurement is performed only on predefined (or signaled) limited time/frequency resources (region). Hereinafter, for simplicity, the limited time/frequency resources (region) in which the D2DSS receive power measurement is performed may be referred to as "SILENT_DURATION (which may be interpreted as, for example, a D2DSS measurement period in Table 6, which will be described later). For example, the SILENT_DURATION may be considered not to have D2DSS (RX) power fluctuation or a low probability of D2DSS (RX) power fluctuation. The SILENT_DURATION may be composed of, for example, time(/frequency) resources (region) on which the same number of D2DSS transmissions is guaranteed or time(/frequency) resources (region) with a small difference in the number of D2DSS transmissions. For example, the SILENT_DURATION configuration information may be delivered to the UE through a predefined signal (e.g., RRC, SIB, Physical D2D Share Channel (PD2DSCH)). The number of D2DSS transmissions may mean, for example, the number of D2DSSs actually transmitted, the average number of D2DSSs transmitted, or the maximum (or minimum) number of D2DSSs that may be transmitted.

For example, Embodiment 3 may be applied to all cases where the D2DSS (RX) power fluctuation phenomenon occurs (regardless of whether or not Embodiment 1 and/or Embodiment 2 described above are applied).

Embodiment 4

When a specific (one) D2DSS configuration is established for multiple D2D resource pool configurations or shared among multiple D2D resource pool configurations, and Embodiments 1, 2, and/or 3 are applied, a rule may be defined such that the (open-loop) transmit power parameter and/or cycling prefix (CP) configuration (or CP length) (see Table 4 below) of a D2DSS transmitted on a valid D2DSS resource of a specific D2D resource pool configuration adopts or inherits the (open-loop) transmit power parameter and/or CP configuration (or CP length) set in the specific D2D resource pool configuration. Thus, for example, if different (open-loop) transmit power parameters and/or CP configurations (or CP lengths) are set for respective D2D resource pool configurations, the (open-loop) transmit power parameter and/or CP configuration (or CP length) of the D2DSS transmitted on the valid D2DSS resource of each D2D resource pool configuration may also be set differently.

For example, if an offset related to D2DSS (open-loop) transmit power configuration is defined (or signaled) for each D2D resource pool configuration, the (open-loop) transmit power parameter of the D2DSS transmitted on a valid D2DSS resource of a specific D2D resource pool configuration may be derived/calculated by adding a D2DSS (open-loop) transmit power-related offset (set in the specific D2D resource pool configuration) to the (open-loop) transmit power parameter set in the specific D2D resource pool configuration. Here, for example, a rule may be defined such that the D2DSS (open-loop) transmit power-related offset is set to (or signaled as) a common value among multiple D2D resource pool configurations sharing a specific (one) D2DSS configuration, or is set to (or signaled as) an independent (or different) value for each D2D resource pool configuration.

As another example, when a specific (one) D2DSS configuration is established for multiple D2D resource pool configurations or shared among multiple D2D resource pool configurations (in the present invention), and Embodiments 1, 2, and/or 3 are applied, a rule may be defined such that the (open-loop) transmit power parameter and/or CP configuration (or CP length) of a D2DSS transmitted on a valid D2DSS resource of a specific D2D resource pool configuration (commonly) adopts or inherits the (open-loop) transmit power and/or CP configuration of a representative D2D resource pool configuration selected/derived according to a predefined rule among the multiple D2D resource pool configurations sharing the specific (one) D2DSS configuration.

For example, application of the above-mentioned rule may mean that the (open-loop) transmit power and/or CP configuration of a representative D2D resource pool configuration selected/derived according to a predefined rule is commonly applied to D2DSSs transmitted on valid D2DSS resources of multiple D2D resource pool configurations sharing a specific (one) D2DSS configuration. For example, the representative D2D resource pool configuration may be selected/derived based on the period, the D2D (discovery/communication) signal type, and/or the D2D communication type. For example, a D2D resource pool configuration having a relatively long (or short) period may be set to the representative D2D resource pool configuration. Alternatively, for example, the Type 2B (or Type 1) discovery resource pool configuration may be selected/derived as the representative D2D resource pool configuration. Alternatively, for example, the discovery resource pool configuration (or communication resource pool configuration) may be set as the representative D2D resource pool configuration.

Table 4 shows an example of the CP configuration and transmit power configuration related to D2D communication.

Embodiment 5

When a D2DSS (sequence/transmission period/transmission resource period) for discovery use and a D2DSS (sequence/transmission period/transmission resource period) for communication use are configured independently (or separately), the UE transmitting both the discovery (signal) and the communication (signal) may be configured to transmit only the D2DSS for communication use. For example, the D2DSS for communication use may be configured at intervals of a relatively short period (e.g., 40 ms or 80 ms) compared to the D2DSS for discovery use.

In addition, for example, when the D2DSS (sequence/transmission period/transmission resource period) for discovery use and the D2DSS (sequence/transmission period/transmission resource period) for communication use are configured independently (or separately), the D2D UE transmitting both the discovery (signal) and the communication (signal) may be configured to transmit only the D2DSS for discovery use.

For example, when the D2DSS (sequence/transmission period/transmission resource period) for discovery use and the D2DSS (sequence/transmission period/transmission resource period) for communication use are configured independently (or separately), the D2D UE may be configured to transmit only a D2DSS having a relatively short (or long) period, be configured to transmit only the D2DSS related to D2D communication based on a scheme (e.g., D2D communication mode 1 or Type 2B/2A DS) in which a D2D signal transmission-related resource is directly designated by a cell (or eNB) for individual D2D transmitting UEs, or be configured to transmit only the D2DSS related to D2D communication based on a scheme (e.g., D2D communication mode 2 or Type 1 DS) in which the D2D UE may select a method (e.g., D2D communication mode 2 or type 1 DS) in which an individual D2D transmitting UE selects an appropriate resource within a resource pool configured by the cell (or eNB) for a plurality of D2D transmitting UEs.

Table 5 below is an example of a D2D signal transmission method when overlapping occurs/is allowed between D2D signal resources (or D2D signal resource pools) (in a time resource region).

TABLE 4

| CP LENGTH |
| --- |
| CP for Type 1, Type 2B, Mode 2 data, Mode 1 data and SA can be configured independently.<br>Note that for Mode 1 the CP length configuration is via SIB.<br>CP for discovery, Mode 2 data, and SA can be configured on a resource pool basis.<br>A UE is not expected to receive any D2D transmissions with different CP length in the same subframe [on a given carrier]. |
| POWER CONTROL |
| OLPC parameter configuration<br>Parameters for SA and data are independently configured.<br>Parameters for multiple resource pools are independently configured.<br>D2DSS/PD2DSCH transmission power<br>Option 1: OLPC parameters for D2DSS are independently configured.<br>Option 2: OLPC parameters for a certain resource pool are reused with a power offset value configured by eNB.<br>D2D transmission power in a subframe<br>D2D transmission power is constant in a D2D subframe with possible exception for D2DSS. |

TABLE 5

When transmissions of D2DSS/PD2DSCH overlap in time in a given carrier in a single UE with any other D2D channel, the UE transmits D2DSS/PD2DSCH
FFS whether the "other D2D channel" can be punctured or is not transmitted
FFS until RAN1#79:
When SA and D2D data overlap in time and frequency in a given carrier in a single UE, the UE transmits SA and not the D2D data
When any other D2D channel transmissions overlap in time and frequency in a single UE, no behaviour is specified.
Apart from D2DSS/PD2DSCH, if two D2D channels overlap in time and frequency, which one to receive is up to UE implementation Embodiment 6

For example, when overlapping occurs/is allowed between D2D signal resources (or D2D signal resource pools) (in a time resource region), transmission/reception of signals having a relatively low priority may not be allowed on resources (or a resource pool) associated with transmission/reception of signals having a relatively high priority. For example, "priority" is an indicator indicating whether which (D2D) signal transmission is prioritized when multiple (D2D) signal transmissions are scheduled (or triggered) simultaneously at the same point in time (or a time region in which some or all transmissions overlap) (For example, (D2D) signal transmission having a relatively low priority may be omitted (dropped)). The priorities may be defined in order of "(WAN uplink (UL)>) D2DSS(/PD2DSCH)>discovery>SA>data" or defined in order of "(WAN uplink (UL)>) D2DSS(/PD2DSCH)>SA>data>discovery" (See Table 5).

On a resource (or resource pool) related to D2D signal transmission/reception with a relatively high priority, transmission/reception of a specific signal having a relatively low priority that satisfies at least part or all of the following conditions may be exceptionally allowed (when D2D signal transmissions having the corresponding high priority are not simultaneously scheduled (or triggered)). Here, for example, transmission/reception of the remaining signals having a relatively low priority excluding the specific signal may not be allowed on a D2D signal transmission/reception-related resource (or resource pool) having a relatively high priority. In addition, configurability may be defined, for example, for some or all of the pre-configured (or signaled) rules which will be described later. For example, configurability may mean that a rule to be applied among the some of or all preconfigured or signaled rules which will be described later is signaled.

Embodiment 6-1

A rule may be defined such that transmission of a specific D2D signal having a relatively low priority based on eNB triggering (or scheduling) is exceptionally allowed. Here, transmission of the specific D2D signal having a relatively low priority based on eNB triggering (or scheduling) may mean, for example, transmission of an SA channel related to Mode 1 D2D communication (which may be referred to as "Mode 1 CM"). The transmission of the specific D2D signal having a relatively low priority based on eNB triggering (or scheduling) may include data channel transmission related to Mode 1 CM, transmission of Type 2 discovery (which may be referred to as, for example, "Type 2 DS" and may be limited to Type 2A or 2B discovery), and/or eNB triggering (command)-based D2DSS/PD2DSCH transmission.

For example, the priority order of "(WAN UL>) D2DSS(/PD2DSCH)>discovery>SA>data" may be applied. In this case, if Mode 1 CM-related SA channel transmission is triggered (or scheduled) in a part where the D2D discovery resource (or D2D discovery resource pool) and the D2D SA resource (or D2D SA resource pool) overlap (in the time resource region), Mode 1 CM-related SA channel transmission may be exceptionally allowed according to a predefined rule. If transmission of discovery and Mode 1 CM-related SA channel transmission are simultaneous triggered in a part where the D2D discovery resource (or D2D discovery resource pool) and the D2D SA resource (or D2D SA resource pool) overlap, the UE may perform discovery transmission according to a predefined (or signaled) priority rule.

Embodiment 6-2

A rule may be defined such that transmission of a specific D2D signal having a relatively low predefined (or signaled) priority is exceptionally allowed. Here, for example, a specific D2D signal with a relatively low priority which is exceptionally allowed to be transmitted may include an SA channel (which may be limited to, for example, an SA channel related to Mode 1 CM (or Mode 2 D2D communication (Mode 2 CM))), a data channel (which may be limited to, for example, a data channel related to Mode 1 CM (or Mode 2 CM)), a DS (which may be limited to, for example, a DS related to Type 2A DS, Type 2B DS, or Type 1 DS), a D2DSS (e.g., a D2DSS transmitted from an in-coverage D2D synchronization source or an out-of-coverage D2D synchronization source), and/or a PD2DSCH (e.g., a PD2DSCH transmitted from an in-coverage D2D synchronization source or an out-of-coverage D2D synchronization source).

Embodiment 6-3

In terms of the resource (or resource pool) period (and/or the D2D signal transmission period), a rule may be defined such that transmission of a D2D signal with a relatively low priority which has a longer (or shorter) period than a D2D signal having a relatively high priority is exceptionally allowed. More specifically, for example, the priority order of "(WAN UL>) D2DSS(/PD2DSCH)>discovery>SA>data" may be applied. In this case, where the D2D discovery resource (or the D2D discovery resource pool) based on the 320 ms period and the D2D SA resource (or the D2D SA resource pool) based on the 40 ms period overlap (in the time resource region), SA channel transmission may be exceptionally allowed. As another example, where a D2D discovery resource (or D2D discovery resource pool) based on a 320 ms period and a D2D SA resource (or a D2D SA resource pool) based on the 40 ms period overlap (in the time resource region), if discovery transmission and SA channel transmission are triggered at the same time, the D2D UE may perform discovery transmission according to a predefined (or signaled) priority rule. The above-mentioned rule may be applied even when overlapping occurs between D2D signal transmission(/reception) related resources (or resource pools) having the same priority (in the time resource region). In addition, for example, the above-mentioned rule may be applied only between predefined signals (for example, between "discovery and SA" and/or "between discovery and data" and/or "between SA and data").

Embodiment 6-4

Transmission of a specific D2D signal having a relatively low priority that is performed based on the DL timing (or UL timing) may be exceptionally allowed. For example, D2D signal transmission performed based on the DL timing may be an SA channel (and/or a Mode 2 CM-related data channel and/or a type 1 DS). In addition, D2D signal transmission performed based on the UL timing may be a Mode 1 CM-related data channel (and/or a type 2 DS). In addition, transmission of a specific D2D signal having a relatively low priority that is performed, for example, by an in-coverage D2D UE or an out-of-coverage D2D UE may be exceptionally allowed. As another example, transmission of a specific D2D signal having a relatively low priority that is performed on a transmit power less (or greater) than a predefined (or signaled) threshold, or transmission of a D2D signal having a relatively low priority that is performed based on a transmit power lower (or higher) than that of a D2D signal having a relatively high priority may be exceptionally allowed.

Embodiment 6-5

Transmission of specific D2D signals based on predefined (or signaled) eNB triggering (or scheduling) may be exceptionally allowed. Alternatively, transmission of a specific D2D signal may be exceptionally allowed regardless of eNB triggering (or scheduling). Here, for example, the specific D2D signal may be defined as a D2DSS/PD2DSCH (e.g., a D2DSS/PD2DSCH transmitted from an in-coverage D2D synchronization source or an out-of-coverage D2D synchronization source), an SA channel (e.g., a Mode 1 CM or Mode 2 CM-related SA channel), a data channel (e.g., a Mode 1 CM or Mode 2 CM-related data channel), a DS (e.g., a type 2A DS, a type 2B DS, or a type 1 DS), and/or a PD2DSCH.

Embodiment 6-6

A rule may be defined such that reception (or transmission) of a D2D signal (with a relatively low priority) is exceptionally allowed.

Embodiment 6-7

On a resource (or resource pool) related to a D2D signal (transmission/reception) having a relatively high priority (for example, when transmission of D2D signals having a corresponding high priority is not simultaneously scheduled (or triggered), allowing transmission (or reception) of a specific D2D signal having a relatively low priority may be performed or assumed to be performed only when configuration of the CP length and/or timing (reference) of the D2D signal having a relatively high priority is identical to configuration of the CP length and/or timing (reference) of the D2D signal having a relatively low priority.

Embodiment 7

For example, when overlapping occurs (or is allowed) between D2D signal resources (or D2D signal resource pools) (in the time resource region), transmission(/reception) of signals having a relatively low priority may be configured not to be allowed on the resource (or resource pool) related to transmission(/reception) of a D2D signal having a relatively high priority.

However, for example, when Embodiment 1 described above is applied (and/or a specific D2DSS configuration is shared among multiple D2D (discovery/communication) resource pool configurations), the valid D2DSS resources of a specific discovery resource pool configuration may be configured by (or limited to) the nearest D2DSS subframe among all D2DSS subframes including the starting point (or the first subframe) configured by a specific (one) D2DSS configuration.

For example, it may be considered that a D2DSS (related to the nearest D2D resource pool thereafter) is transmitted or is likely to be transmitted in the corresponding valid D2D subframe. The following embodiments relate to rules of transmission/reception of a D2D signal having a relatively lower priority than the D2DSS on D2DSS resources (or D2DSS subframes) other than the valid D2DSS resources (or valid D2DSS subframes) related to the discovery resource pool. In the following description, for simplicity, D2DSS resources (or D2DSS subframes) other than the valid D2DSS resources (or valid D2DSS subframes) related to the discovery resource pool may be referred to as "INVAL_RSC". In addition, for example, on the corresponding INVAL_RSC, a D2DSS (related to the nearest D2D resource pool thereafter) may be considered not to be transmitted or likely to be transmitted. As described above, multiple D2D resource pool configurations having a specific (one) D2DSS configuration established (or shared) therebetween may be constituted solely by D2D discovery resource pool configurations. For example, this situation may mean that the serving cell (or a specific cell) supports (configures) only D2D discovery according to Embodiment 15 and/or Embodiment 16, which will be described later. As described in Table 6 below, a maximum of one D2DSS resource (or a D2DSS configuration) per cell may be set for the in-coverage D2D UE. If the serving cell (or specific cell) supports (configures) both D2D discovery and D2D communication, the corresponding D2DSS resource (or D2DSS configuration) should be shared between the D2D discovery resource pool configuration(s) and the D2D communication resource pool configuration(s).

When Embodiment 1 described above is applied to such a situation (for example, a case where the serving cell (or a specific cell) supports (configures) only D2D discovery), application of the examples related to Embodiment 7 described above may mean that transmission(/reception) of a predefined D2D signal (with a lower priority than the D2DSS) is exceptionally allowed on INVAL_RSC only if the serving cell (or a specific cell) supports (configures) only the D2D discovery. That is, this may mean that transmission (/reception) of D2D signals having a relatively lower priority than the D2DSS or all D2D signals is not allowed on INVAL_RSC in the other cases (or scenarios). For example, the fact that Embodiment 7 is applied only when the serving cell (or a specific cell) supports (configures) only D2D discovery means that Embodiment 7 is applied only to the D2D UE that performs only the D2D discovery (transmission/reception) operation. As described above, the object of Embodiment 7 is to reduce waste of opportunities for transmission(/reception) of a D2D signal that is caused by disallowing transmission(/reception) of a D2D signal having a lower priority than the D2DSS (or all the D2D signals) on INVAL_RSC in a (specific) situation in which Embodiment 1 is applied.

For example, the following embodiments may be applied even to transmission(/reception) of a D2D signal having a relatively low priority on resources (or subframes) other than the valid (transmission) resources (or valid (transmission) subframes) of a resource pool related to transmission (/reception) of a D2D signal having a relatively high priority in a case where overlap occurs (or is allowed) between D2D signal resources (or D2D signal resource pools) (in a time resource region).

For example, the valid (transmission) resources (or valid (transmission) subframes) of a resource pool associated with D2D signal transmission(/reception) having a relatively high priority may refer to resources on which D2D signal transmission is actually performed (or is likely to be performed). On the other hand, for example, resources (or subframes) other than the valid (transmission) resources (or valid (transmission) subframes) of a resource pool associated with D2D signal transmission(/reception) having a relatively high priority may refer to resources on which the D2D signal transmission is not actually performed (or is unlikely to be performed).

For example, configurability may be defined between some (or all) of the following preconfigured (or signaled) embodiments. For example, configurability may mean signaling an embodiment to be applied among some (or all) of the following preconfigured (or signaled) embodiments.

Embodiment 7-1

On INVAL_RSC, transmission of a specific D2D signal having a relatively low priority (lower than the priority of the D2DSS) based on eNB triggering (or scheduling) may be exceptionally allowed. For example, transmission of a specific D2D signal with a relatively low priority based on eNB triggering (or scheduling) may be defined as Mode 1 CM-related SA channel transmission (and/or Mode 1 CM-related data channel transmission and/or Type 2 DS transmission (e.g., Type 2A DS or Type 2B DS) and/or eNB triggering (or command)-based D2DSS(/PD2DSCH) transmission).

For example, in the case where the priority order of "(WAN UL>) D2DSS(/PD2DSCH)>discovery>SA>data" is applied, if the Mode 1 CM-related SA channel transmission is triggered (or scheduled) on INVAL_RSC, the Mode 1 CM-related SA channel transmission may be exceptionally allowed according to a predefined rule.

Embodiment 7-2

On INVAL_RSC, transmission of a specific D2D signal having a relatively low priority (lower than the priority of the D2DSS) that is predefined (or signaled) may be exceptionally allowed. Here, for example, the specific D2D signal having a relatively low priority whose transmission is exceptionally allowed may be defined as a D2DSS(/PD2DSCH) (e.g., a D2DSS(/PD2DSCH) transmitted from an in-coverage D2D synchronization source or an out-of-coverage D2D synchronization source), an SA channel (e.g., a Mode 1 CM or Mode 2 CM-related SA channel), a data channel (e.g., a Mode 1 CM or Mode 2 CM-related data channel), a DS (e.g., a type 2A DS, a type 2B DS, or a type 1 DS), and/or PD2DSCH.

Embodiment 7-3

In terms of the resource (or resource pool) period (and/or the D2D signal transmission period), on INVAL_RSC, transmission of a D2D signal with a relatively low priority which has a longer (or shorter) period than the D2DSS (or a D2D signal having a relatively high priority) may be exceptionally allowed. Specifically, when the priority order of "(WAN UL>) D2DSS(/PD2DSCH)>discovery>SA>data" is applied as a rule, if the D2DSS resources (or D2DSS resource pool) are configured with a periodicity of 80 ms, and the SA resources (or SA resource pool) are configured with a periodicity of 40 ms, transmission of SA channels based on a relatively short periodicity may be exceptionally allowed on INVAL_RSC.

Embodiment 7-4

Transmission of a specific D2D signal having a relatively low priority (lower than the priority of the D2DSS) that is performed based on the DL timing (or UL timing) may be exceptionally allowed on INVAL_RSC. For example, D2D signal transmission performed based on the DL timing may be an SA channel (and/or a Mode 2 CM-related data channel and/or a type 1 DS). In addition, D2D signal transmission performed based on the UL timing may be a Mode 1 CM-related data channel (and/or a type 2 DS).

As another example, transmission of a specific D2D signal having a relatively low priority (lower than the priority of the D2DSS) that is performed, for example, by an in-coverage D2D UE (or out-of-coverage D2D UE) may be exceptionally allowed on INVAL_RSC.

As another example, transmission of a specific D2D signal having a relatively low priority (over the D2DSS) performed based on a transmit power less (or greater) than a predefined (or signaled) threshold, or transmission of a specific D2D signal with a relatively low priority (over D2DSS) performed based on a transmit power lower (or higher) than that of the D2DSS (or a D2D signal with a relatively high priority) may be exceptionally allowed.

Embodiment 7-5

Transmission of a specific D2D signals based on predefined (or signaled) eNB triggering (or scheduling) may be exceptionally allowed, or transmission of a specific D2D signal may be exceptionally allowed (regardless of whether eNB triggering (or scheduling) is performed).

For example, the specific D2D signal may include an SA channel (e.g., a Mode 1 CM or Mode 2 CM-related SA channel), a data channel (e.g., a Mode 1 CM or Mode 2 CM-related data channel), a DS (e.g., a type 2A DS, a type 2B DS, or a type 1 DS), and/or a PD2DSCH (e.g., a PD2DSCH transmitted from an in-coverage D2D synchronization source or an out-of-coverage D2D synchronization source).

Embodiment 7-6

On INVAL_RSC, reception (or transmission) of a D2D signal (having a relatively low priority) may be exceptionally allowed.

Embodiment 7-7

On INVAL_RSC, allowing transmission (or reception) of a specific D2D signal having a relatively low priority may be performed or assumed to be performed only when configuration of the CP length and/or timing (reference) of the D2DSS priority is identical to configuration of the CP length and/or timing (reference) of the D2D signal having a relatively low priority.

It is apparent that examples of the above-described embodiments are also included in one of the implementation methods of the present invention, and each example may constitute an independent embodiment. Furthermore, each of the above-described embodiments may be implemented independently, or may be combined (or merged) with some embodiments. The above-described embodiments may be limitedly applied only in the FDD system (or TDD system) environment. The embodiments described above may be applied only to transmission of a discovery message (of a specific type/mode) or to D2D data channel transmission or SA transmission.

Table 6 below shows an example of conditions for D2DSS transmission, and the content of Table 6 may also be included as an embodiment of the present invention.

TABLE 6

| UEs INSIDE NETWORK COVERAGE |
|---|
| For UEs inside network coverage, conditions for D2DSS transmissions are basically defined from eNB signaling. In the agreement in RAN1#77, both SIB and dedicated RRC signaling can be used to configure D2DSS sequences to be used for transmissions. In addition, the agreement is saying that eNB can instruct a UE to transmit D2DSS for Type 2B discovery, and it is our understanding that this instruction should use dedicated signaling because of the UE-specific nature of Type 2B discovery. From these agreements, it can be claimed that eNB can instruct D2DSS transmission (with the D2DSS sequence to use) using both SIB and dedicated signaling. Furthermore, it will be straightforward to encompass all the D2D operations including D2D communications.<br>When a UE receives dedicated signaling instructing D2DSS transmissions, it shall transmit D2DSS accordingly regardless of any other D2DSS-related signaling it can receive via SIB. We note that this instruction can be implicit, for example, a UE transmits D2DSS if it receives signaling for D2DSS sequences and D2DSS resources via dedicated signaling.<br>When a UE receives SIB instructing D2D transmissions, all the SIB-receiving UEs may transmit D2DSS which may be unnecessarily excessive in some cases. So, an additional condition can be considered to avoid such cases. To be specific, RSRP from the serving cell can be used such that only the UEs having RSRP lower than a network-configured threshold transmit D2DSS. We note that this RSRP threshold test is basically motivated from the test of D2DSS received signal strength in UEs outside network coverage.<br>Proposal 1: Both dedicated signaling and SIB can be used for eNB to instruct D2DSS transmissions.<br>Proposal 2: eNB can configure a threshold such that UEs having RSRP less than the threshold transmit D2DSS.<br>One open issue in the D2DSS transmission condition is how to interpret the RAN1#77 agreement on the same D2DSS configuration between communication and discovery (copied from chairman's note of RAN1#78):<br>AGREEMENT (RAN1#77 MEETING): |
| D2DSS transmission configuration is the same between D2D discovery and D2D communication if NW supports both D2D communication and discovery<br>RAN1 understands "D2DSS transmission configuration" in this agreement to include at least the D2DSS sequences.<br>ALT 1: |
| D2DSS resource periodicity and transmission periodicty are both the same between D2D discovery and D2D communication if NW supports both D2D communication and discovery<br>ALT 2: |
| D2DSS resource periodicity is the same between D2D discovery and D2D communication if NW supports both D2D communication and discovery, but the D2DSS transmission periodicity may be different between D2D discovery and D2D communication<br>ALT 3: |
| Both D2DSS resource periodicity and transmission periodicty can be different between D2D discovery and D2D communication if NW supports both D2D communication and discovery.<br>AlT 4: |
| D2DSS transmission configuration for a given UE is the same between D2D discovery and D2D communication if the UE supports both D2D communication and discovery<br>It is generally understood that a short D2DSS period is necessary for communication (especially the communication with out-NW UEs using a pre-configured D2DSS period) while the discovery period is much longer. Thus, it will cause unnecessary battery consumption if a UE transmitting only discovery is required to transmit D2DSS much more frequently than the discovery period. In order to solve this issue under the agreement of using the same D2DSS transmission configuration between discovery and |

TABLE 6-continued communication, we propose to allow a discovery-only UE to select its own D2DSS
transmission subframes among the whole D2DSS subframes configured in the cell. For
example, such a UE can transmit D2DSS just before the start of the discovery resource
pool relevant to its transmission as illustrated in FIG. 3.5. From this discussion,
"D2DSS transmission configuration" in the RAN1#77 agreement can be understood as
"configuration in which D2DSS transmission is allowed" not necessarily implying that
the UE shall transmit D2DSS in everywhere indicated by the configuration.
Proposal 3: A UE participating only in discovery transmissions can select a subset
of the configured D2DSS subframes for its D2DSS transmission to align D2DSS
transmission period with its discovery transmission period.
Down-selecting D2DSS transmission subframes results in D2DSS power fluctuations.
This may be problematic to an out-NW UE which determines from the received
D2DSS strength the D2DSS to be used as the timing reference and whether to become
a synchronization source. One way of solving this problem is to confine D2DSS
received power measurement to a certain time resources where no power fluctuation
happens. For this purpose, the D2D-silent duration (or time-to-scan), which was
proposed to enable detecting asynchronous D2DSS with reduced interference [1], can
be used. The time-to-scan can be properly configured such that it does not include the
subframes where D2DSS transmissions with a shorter overlap with those with a longer
period.
UES OUTSIDE NETWORK COVERAGE It was agreed that received D2DSS strength can be used to determine whether to
transmit D2DSS as in the RAN1#76bis agreement. This is beneficial in that a UE very
close to another UE already transmitting D2DSS may skip its own D2DSS
transmission to reduce the battery consumption. Multiple threshold values including the
infinity can be defined and one of them can be preconfigured for the UEs. It is our
understanding that this threshold test is not for defining whether a UE detected a
D2DSS; otherwise, the infinite threshold will imply that a D2DSS can never be
detected. The purpose of this threshold test is to decide whether a UE detecting a
D2DSS can also transmit its own D2DSS.
Proposal 4: Values other than the infinity can be the received D2DSS signal
strength threshold which determines whether a UE detecting a D2DSS can also
transmit its own D2DSS.
Details of the synchronization procedure are discussed in the companion paper, and one
relevant discussion topic is which UE can be the independent synchronization source
(ISS). According to the evaluation results, allowing non-data TX UEs to become ISS
unnecessarily increases the number of D2DSS sequences each RX UE needs to track.
Therefore, the existence of D2D data can be a condition of transmitting D2DSS when
no other D2DSS is detected.
Proposal 5: A UE detecting no D2DSS can transmit D2DSS only when it has D2D
data to transmit.
Another topic is under which condition a UE transmits D2DSS in D2DSSue_net or
D2DSSue_oon. It is obvious that a UE operating Mode 1 communication will transmit
D2DSS in D2DSSue_net. When a UE operates Mode 2 communication, it can be the
basic principle that D2DSS in D2DSSue_net (actually D2DSS configured by the
network) is transmitted whenever the UE uses the resource pool configured by the
network. For example, as mentioned in [2], a UE once configured with Mode 1 but
operating Mode 2 in the exceptional case may use Mode 2 resources provided by the
current cell. This implies that a UE in the exceptional case still considered itself as an
in-NW UE which using a network-configured resource, therefore, it is reasonable for
the UE to transmit D2DSS in D2DSSue_net. If this is the case, the UE can transmit
D2DSS in D2DSSue_oon only if it exit from the exceptional case and finds no further
network connection. We note that the exceptional case only available to an
RRC_CONNECTED UE, and some other criterion (e.g., RSRP or RSRQ threshold)
might be needed for an RRC_IDLE UE to decide whether to use D2DSS in
D2DSSue_oon.
Proposal 6: It needs to be clarified that a UE shall use D2DSS configured by the
network when it uses D2D resources provided by the network (e.g., during the
exceptional case). Further discussion is necessary on the exact condition of using
D2DSS in D2DSSue_oon.

REFERENCE
[1] R1-142662, "WF on selection and reselection," Samsung, LGE.
[2] R1-142805, "Reply LS on D2D resource allocation Modes 1&2," RAN WG2.

The D2DSS is transmitted only on some symbols of one subframe. Accordingly, when D2DSS transmission overlaps transmission of another D2D channel (discovery, SA, communication data) in a D2DSS subframe, the D2DSS may be transmitted on the symbol for transmission of the D2DSS, and the other D2D channel may be transmitted on the remaining symbols. Thereby, the D2DSS and another D2D channel may be transmitted together in one subframe. At this time, the CP length used by the D2DSS may be different from the CP length used by the other D2D channel. In this case, the following method may be used for UE operation.

Embodiment 8

If the CP lengths of the D2DSS and the other D2D channel are the same, the D2DSS and the other D2D channel may be transmitted together in one subframe. However, if the CP lengths are different, the other D2D channel may not be transmitted. As a result, when the CP lengths are different, only the D2DSS is transmitted in the corresponding subframe. Through this operation, a complex operation of transmitting a signal while changing the CP length within the same subframe may be prevented, and implementation of the UE may be simplified.

Embodiment 9

When the CP length of the D2DSS is different from that of the other D2D channel, the other D2D channel is transmitted on a symbol which at least partially overlaps the D2DSS symbol. That is, the other D2D channel may be transmitted using only symbols that never overlap the D2DSS symbol. Overlap may be defined based on the symbol boundary, or may be defined based on a certain transient period in consideration of the change time of the CP length. For example, the other D2D channel may not be transmitted on an overlapping symbol in a time region including a certain transient period before and after the D2DSS symbol boundary.

Embodiment 10

When the CP length of the D2DSS is different from that of the other D2D channel, the CP length of the other D2D channel transmitted in the corresponding D2DSS subframe may be transmitted according to the CP length of the D2DSS (on a symbol at least partially overlapping the D2DSS symbol). Therefore, a complex operation of transmitting a signal while changing the CP length within the same subframe may be prevented, and UE implementation may be simplified.

Embodiment 11

When D2DSS transmission overlaps transmission of another D2D channel (discovery, SA, communication data) in a D2DSS subframe, the D2DSS may be transmitted on a symbol for transmission of the D2DSS, but the other D2D channel may be transmitted on the remaining symbols. In this case, the CP length of the other D2D channel may be transmitted according to the CP length of the D2DSS (e.g. the CP length of PD2DSS or CP length of SD2DSS) (or a CP length predefined for this purpose (e.g., an extended CP length or a normal CP length)).

Embodiment 12

When D2DSS transmission overlaps transmission of another D2D channel (e.g., discovery, SA, or communication data) in a D2DSS subframe, the D2DSS may be transmitted on the symbol for transmission of the D2DSS, and the other D2D channel may be transmitted on the remaining symbols. In this case, the (open-loop) power control parameter of the other D2D channel transmitted in the corresponding D2DSS subframe may be configured according to the (open-loop) power control parameter of the D2DSS (e.g., the (open-loop) power control parameter of the PD2DSS, the (open-loop) power control parameter of the SD2DSS, or the (open-loop) power control parameter of the lower (or higher) power between the PD2DSS and the SD2DSS) (or an (open-loop) power control parameter predefined for this purpose).

For example, Embodiment 12 may be applied in combination with the above-described embodiments (for example, Embodiment 8, Embodiment 9, Embodiment 10, and/or Embodiment 11). In another example, when D2DSS transmission overlaps transmission of another D2D channel (e.g., discovery, SA, and/or communication data) in a D2DSS subframe, the D2DSS may be transmitted on the symbol for transmission of the D2DSS, and the other D2D channel may be transmitted on the remaining symbols. In this case, the (open-loop) power control parameter of the other D2D channel transmitted in the corresponding D2DSS subframe may be configured according to the (open-loop) power control parameter of the PD2DSCH.

As another example, Embodiment 12 may be applied only when the CP lengths of the D2DSS and the other D2D channel are different from each other (or when the CP lengths of the D2DSS and the other D2D channel are the same).

The above-described embodiments (for example, Embodiments 8, 9, 10, 11 and/or 12) may be applied when the D2DSS overlaps the other D2D channel on at least some physical resource blocks (PRBs) of the same subframe. The above-described embodiments may also be applied when the D2DSS and the other D2D channels do not overlap on the PRB. This is intended to obtain an effect of preventing interference by stopping transmission of the other channels on the symbol for transmission of the D2DSS even if other PRBs are used. The embodiments described above may be implemented independently, or may be implemented by combining (or merging) some embodiments (e.g., Embodiments 8 and 12, or Embodiments 9, 10, and 12).

For example, the proposed method for the D2D UE to efficiently transmit the D2DSS may be referred to by Table 7 below. For example, Embodiment 13 and/or Embodiment 14 in Table 7 may be treated as independent embodiments without being merged (or correlated) with the content of Table 7.

TABLE 7

This contribution discusses remaining details of D2D synchronization procedures of in-NW and out-NW UEs. For the in-NW UEs, RAN1 made substantial progress in the last meeting by the following agreements, and most of the remaining issues are about the detailed condition for D2DSS transmissions:
AGREEMENT:

For in-coverage UEs,
A maximum of 1 D2DSS resource (comprising a periodically occurring subframe in which D2DSS may be transmitted if the conditions below are satisfied (note that the eNB may reuse resources which are not used for D2DSS transmission)) can be configured per cell for in coverage UEs
The D2DSS resource periodicity is:
The same for in-coverage and out-of-coverage
Fixed to 40 ms in the specifications
The D2DSS resource can be configured with a time offset with a granularity of 1 subframe
The D2DSS resource offset of neighbour cells can be signalled in a SIB w.r.t. SFN#0 of the serving cell with a granularity of 1 subframe
For a UE transmitting SA or D2D data, in each subframe in the D2DSS resource, the UE shall transmit D2DSS if:

TABLE 7-continued the subframe does not conflict with cellular transmission from the UE perspective, AND
FFS other defined conditions, including e.g. UE capability, are satisfied, AND
the subframe is within the SA or D2D data period in which SA or data is
transmitted, AND
the UE is RRC_Connected and the eNB has instructed it (by dedicated signalling)
to start D2DSS transmission, AND/OR FFS other condition(s) are satisfied if the UE
is not transmitting SA or D2D data within the SA/data period in which the subframe
falls OR all of the following conditions are satisfied:
an RSRP threshold for communication D2DSS transmission is configured, AND
if configured, the threshold is configured using SIB
the threshold can take values {−infinity, −115 . . . −60 (increments of 5), +infinity}dBm
the RSRP value of the UE is less than the threshold, AND
the eNB has not instructed the UE (by dedicated signalling) to stop D2DSS
transmission.
For a discovery UE, for each discovery pool, the UE shall transmit D2DSS in the first
subframe of the discovery pool if this subframe is in the D2DSS resource, or otherwise
in the latest subframe of the D2DSS resource before the start of the discovery pool, if:
the subframe does not conflict with cellular transmission from the UE perspective,
AND
FFS: the UE is not scanning for other D2DSS (details FFS), AND
FFS other defined conditions, including e.g. UE capability, are satisfied, AND
the UE transmits a discovery message in the discovery pool, AND
the UE is RRC_Connected and the eNB has instructed it (by dedicated signalling) to
start D2DSS transmission, OR all of the following conditions are satisfied:
an RSRP threshold for discovery D2DSS transmission is configured, AND
if configured, the threshold is configured using SIB
the threshold can take values {−infinity, −115 . . . −60 (increments of 5), +infinity}dBm
the RSRP value of the UE is less than the threshold, AND
the eNB has not instructed the UE (by dedicated signalling) to stop D2DSS
transmission.
AGREEMENT:

higher layer indicates w1 in a given neighbor cell, UE may assume for the purpose of
discovery a reference synchronization window of size +/−w1 ms for that neighbour cell
with respect to neighbour cell D2DSS resource
w1 is a fixed value and decided by RAN4
UE may assume D2DSS is transmitted in that cell
If higher layer indicates w2 in a given neighbor cell, UE may assume for the purpose
of discovery a reference synchronization window of size +/−w2 ms for that neighbour
cell with respect to neighbour cell discovery resource
Exact value of w2 is decided by RAN4
RAN1 recommend w2 as not greater than CP length (of the order of CP length)
UE expects that D2DSS indicated by the resource pool configuration appears only
within signaled reference synchronization window
For the out-NW UEs, some discussion took place in the last meeting but only the
D2DSS resource part was agreed as follows: To complete the synchronization
procedure, more details are necessary about when and which D2DSS a UE transmits as
well as how the synchronization re-selection procedure is performed.
AGREEMENT:

Out-of-coverage UEs do not transmit D2DSS on more than 1 D2DSS resource
2 D2DSS resources are used for out-of-coverage
FFS whether the locations are preconfigured, signalled or fixed in the spec w.r.t.
DFN#0
2. DISCUSSION
2.1 PROCEDURE FOR IN-NW UEs
This section discusses remaining FFS points in the agreements made for D2DSS
transmission and reception for in-NW UEs. D2DSS transmission can be an optional
feature for D2D capable UEs, so it is straightforward to conclude that a UE transmits
D2DSS only if it is capable of D2DSS.
As per the agreement for discovery, a UE transmits D2DSS only in a single subframe
in each discovery period. Such operation can be sufficient for discovery which operates
only for in-NW UEs. As any in-NW UE is synchronized to a cell, the frequency error
between transmitter and receiver UEs is limited and D2DSS detection in a single
subframe can be sufficiently reliable. For the FFS on the D2DSS scanning, no related
condition is necessary, because it was agreed that the serving cell provides D2DSS
resources of neighboring cells and D2DSS resource of multiple cells can be separated
in time by the network configuration. As a minor correction to the agreement, a UE
may not be able to transmit discovery signal in a resource pool, e.g., due to the conflict
with the WAN UL TX. Thus, the condition "the UE transmits a discovery message in
the discovery pool" needs to be changed to "the UE intends to transmit a discovery
message in the discovery pool." (For example, see Embodiment 13)
For communication, it first needs to be discussed whether D2DSS needs to be
transmitted prior to an SA transmission (note that data cannot be transmitted before an
SA transmission) because it is possible in the current agreement that SA is transmitted
first and D2DSS transmission follows if D2DSS resource does not appear before SA
subframes in a SA/data period. As synchronization needs to be made before SA
reception, a condition similar to what is adopted for discovery can be added. In this
case, however, a single subframe D2DSS may not be sufficient to provide reliable

Figure 14B:
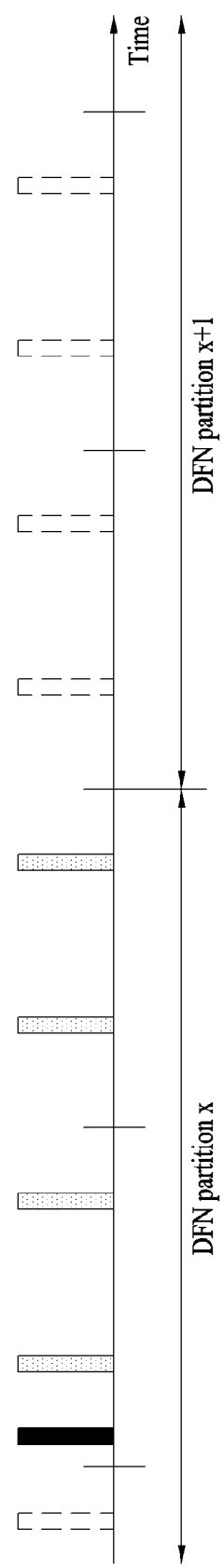
FIG. 14B illustrates an example of D2DSS transmission according to Option 2.
Figure 14C:
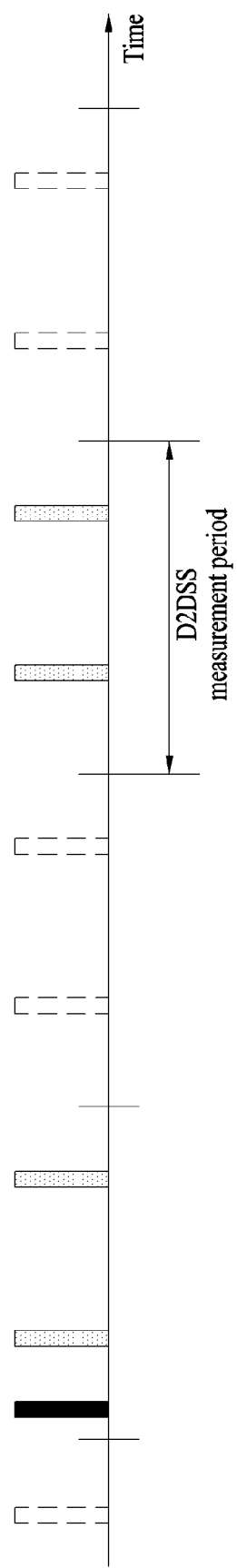
FIG. 14C illustrates an example of D2DSS transmission according to Option 3.

TABLE 7-continued synchronization performance especially for out-NW UEs which may have a large initial frequency offset. Thus, it seems more desirable to transmit D2DSS in multiple subframes prior to an SA transmission. We note that some time limitation is necessary in this advanced D2DSS transmissions because it will be difficult for a UE to make an exact prediction on the intention of SA transmissions if the time gap is large between the D2DSS subframe and the SA subframe. (For example, see Embodiment 14)
In the existing agreement, it is FFS whether a UE transmits D2DSS if it does not transmit SA or data within a SA/data period. We think that the operation for communication should be different from that for discovery in the sense that D2DSS for communication needs to be received by out-NW UEs. To be specific, an out-NW UE can have a large frequency error and D2DSS detection performance should be reliable even in this case. For a faster synchronization of out-NW UEs, an in-NW UE needs to transmit D2DSS continuously at least for some time duration such that out-NW UEs can detect D2DSS at least once in a set of continuous D2DSS transmission subframes. Furthermore, considering that out-NW UEs perform D2DSS measurement for the synchronization reference selection and D2DSS transmission condition, and that reliable measurement requires averaging over several D2DSS subframes, random on-off of D2DSS transmission in the time scale of 40 ms should be avoided. Therefore, for continuous D2DSS transmissions, we propose that, if a certain condition is met, a UE transmits D2DSS even if the UE is not transmitting SA or D2D data within the SA/data period in which the subframe falls. We call this "condition for continuing D2DSS transmission."
This "condition for continuing D2DSS transmission" can be based on the principle that a UE continues D2DSS transmission for some time duration if it has transmitted D2DSS before. This principle guarantees continued D2DSS transmissions which is helpful for D2DSS detection and measurement at the out-NW UEs. We can consider the following options for the details of this condition. FIG. 14a, 14b and 14c illustrates the three options.
Option 1(FIG. 14a): A "D2DSS transmission timer" is defined. If a UE transmits D2DSS in subframe #n by the condition "the subframe is within the SA or D2D data period in which SA or data is transmitted," it continues to transmit D2DSS in subframe #n + 40, #n + 80, . . . , #n + K*40 even when it does not have SA/data to transmit. Here, the value K corresponds to the D2DSS transmission timer.
Option 2(FIG. 14b): The entire DFN range is divided into several time partitions. Assuming that DFN ranges from 0 to 1023 where 1 D2D frame corresponds to 10 ms, DFN partition x includes D2D frame x, x + 1, . . . , x + M − 1 leading to 1024/M DFN partitions. If a UE transmits D2DSS in a subframe belonging to DFN partition x, the UE continues to transmit D2DSS in the remaining D2DSS subframes in the DFN partition x. This option has the advantage that a receiver UE can know the time instance of potential D2DSS transmission change after decoding DFN in the associated PD2DSCH.
Option 3(FIG. 14c): A kind of "D2DSS measurement period" is defined and a UE which transmitted D2DSS in a subframe also transmits D2DSS in the associated D2DSS measurement period. For example, the closest D2DSS measurement period can be the associated one.
On top of the conditions discussed above, it needs to be clarified that a UE shall not transmit D2DSS in a subframe not satisfying the condition for D2DSS transmissions. The eNB is aware of at least a subset of the subframes where no D2DSS is transmitted, and it is possible to use the D2DSS resources in these subframes for cellular transmissions.
The above discussions on the D2DSS transmission from in-NW UEs can be summarized in the following proposals:
Proposal 1: The agreement in RAN1#78bis is refined as follows:
For in-coverage UEs,
For a UE transmitting SA or D2D data, in each subframe in the D2DSS resource, the UE shall transmit D2DSS if:
the subframe does not conflict with cellular transmission from the UE perspective, AND
the UE is capable of D2DSS, AND
the subframe is within the SA or D2D data period in which SA or data is transmitted, OR the subframe is not earlier than X ms from a subframe in which the UE intends to transmit SA (For example, see examples of Embodiment 13 and/or 14), OR the subframe satisfies the "condition for continuing D2DSS transmission," AND
the UE is RRC_Connected and the eNB has instructed it (by dedicated signalling) to start D2DSS transmission, OR all of the following conditions are satisfied:
an RSRP threshold for communication D2DSS transmission is configured, AND
if configured, the threshold is configured using SIB
the threshold can take values {−infinity, −115 . . . −60 (increments of 5), +infinity}dBm
the RSRP value of the UE is less than the threshold, AND
the eNB has not instructed the UE (by dedicated signalling) to stop D2DSS transmission.
For a discovery UE, for each discovery pool, the UE shall transmit D2DSS in the first subframe of the discovery pool if this subframe is in the D2DSS resource, or otherwise in the latest subframe of the D2DSS resource before the start of the discovery pool, if:
the subframe does not conflict with cellular transmission from the UE perspective, AND
the UE is capable of D2DSS, AND
the UE intends to transmit a discovery message in the discovery pool." (For example, see Embodiment 13), AND TABLE 7-continued the UE is RRC_Connected and the eNB has instructed it (by dedicated signalling) to
start D2DSS transmission, OR all of the following conditions are satisfied:
an RSRP threshold for communication D2DSS transmission is configured, AND
if configured, the threshold is configured using SIB
the threshold can take values {−infinity, −115 . . . −60 (increments of 5), +infinity}dBm
the RSRP value of the UE is less than the threshold, AND
the eNB has not instructed the UE (by dedicated signalling) to stop D2DSS
transmission.
Proposal 2: The following three options are considered for the "condition for
continuing D2DSS transmission."
Option 1: A D2DSS timer is defined and a UE which transmitted D2DSS by the
condition of SA/data transmission continues to transmit D2DSS without SA/data
transmission until the timer expires.
Option 2: The entire DFN range is divided into multiple DFN partitions, and a UE
which transmitted D2DSS in a subframe continues to transmit D2DSS during the DFN
partition.
Option 3: A D2DSS measurement period is defined, and a UE which transmitted
D2DSS in a subframe continues to transmit D2DSS in the associated D2DSS
measurement period.
For the reception of D2DSS, the agreement of the reference synchronization window
for discovery can apply to communication as well because discovery and
communication share the same D2DSS resource. After receiving the discovery resource
pools, the UE can know the exact location of D2DSS transmissions for discovery. A
minor correction is necessary in the existing agreement in order to limit the UE
assumption of D2DSS within the synchronization window to the case of w1: This is
because D2DSS may be omitted or transmitted outside the synchronization window in
the case of w2.
Proposal 3: The agreement on the reference synchronization window applies to
both discovery and communication with the correction that "UE expects that
D2DSS indicated by the resource pool configuration appears only within signaled
reference synchronization window if w1 is indicated."
2.1 PROCEDURE FOR OUT-NW UEs
In designing the synchronization procedure for out-NW UEs, one important aspect is to
minimize the number of D2DSS a UE needs to track. A UE can track only a limited
number of D2DSS, so a UE is not able to receive all the incoming SA and data if the
number of D2DSS associated with the incoming SA and data exceeds the limit.
Evaluation results provide the following observation on how to reduce the number of
D2DSS:
Observation: The performance impact caused by limited UE capability of
tracking different timings can be mitigated by the following UE behaviors:
1) A UE synchronized to a D2DSS also transmits the same D2DSS in order to
make a synchronization cluster sharing a common timing.
2) Only data TX UEs can be ISS.
3) ISS excludes a D2DSS sequence in the D2DSS reselection if it transmitted
the same sequence in the previous period.
Based on this observation, the procedure of D2DSS sequence selection for an out-
NW UE can be described as follows:
Step 1: If an out-NW UE selected a D2DSS X in D2DSSue_net as its transmit
timing reference,
A. The UE selects D2DSS Y from D2DSSue_oon and transmit it when it
transmits D2DSS. This selection can be random, or the UE may avoid selecting
D2DSS it has detected during the transmit timing reference selection procedure.
Step 2: else if the UE selected a D2DSS Z in D2DSSue_oon as its transmit timing
reference,
A. UE transmits the same D2DSS Z when it transmits D2DSS.
Step 3: else if UE has D2D data traffic to transmit, it becomes an ISS using a
randomly chosen D2DSS from the D2DSSue_oon.
Step 2 enables D2DSS relaying operation which reduces the number of D2DSS in
the system as per the first observation. In order to implement the third
observation, an ISS which initiated the transmission of D2DSS Z should assume in
Step 2 that D2DSS Z is not detected so that it can be synchronized to another
D2DSS. In other words, an ISS keeps the ISS operation only when it detects
during the reselection procedure no D2DSS other than the one it transmitted
before the reselection. After this procedure, an out-NW UE can determine the
D2DSS sequence to be used if it transmits D2DSS. We note that more precise
definition of "detecting D2DSS" is necessary because, for example, it is
undesirable to assume that D2DSS is detected and can be used as a reliable
synchronization source if the associated PD2DSCH is not correctly decoded or the
quality of PD2DSCH reception is very poor. As an example, a UE assumes that
D2DSS is not detected (so the D2DSS does not affect in the D2D synchronization
procedure of the UE) if the quality of the associated PD2DSCH reception (RSRQ
of the PD2DSCH DM RS, for example) is below a certain level.
Proposal 4: The following principles are adopted for D2DSS sequence selection.
If a UE selected a D2DSSue_oon as its transmit timing reference, it transmits the
same D2DSS (subject to the D2DSS transmission condition in Proposal 5).
A UE assumes that UEs transmitting the same D2DSS sequence are
synchronized.
Now we can discuss under which condition an out-NW UE transmits D2DSS using the
D2DSS sequence selected by the above procedure. Basically, the formulation for the
condition of D2DSS transmission for in-NW UEs can be reused with some

TABLE 7-continued modifications. For a UE not an ISS, D2DSS is transmitted regardless of the SA/data transmission from the UE if D2DSS from another UE is detected. This implies that an additional condition needs to be added to the D2DSS transmission from a non-ISS UE. The RSRP threshold can be replaced by the D2DSS measurement threshold, while any eNB configuration part can be removed. We note that the D2DSS transmission prior to SA transmission and the condition for continuing D2DSS transmission are also necessary for out-NW UEs for reliable D2DSS detection and measurement.
Proposal 5: The following conditions are used to determine whether an out-NW UE transmits D2DSS in a subframe. (For example, examples of Embodiment 13 and/or 14)
For out-coverage UEs,
the UE which is an independent synchronization source, in each subframe in the D2DSS resource it has selected for its D2DSS transmission, shall transmit D2DSS if:
the subframe is within the SA or D2D data period in which SA or data is transmitted. OR the subframe is not earlier than X ms from a subframe in which the UE intends to transmit SA, OR the subframe satisfies the "condition for continuing D2DSS transmission."
the UE which is not an independent synchronization source, in each subframe in the D2DSS resource not used for receiving its transmit synchronization reference, shall transmit D2DSS if:
the subframe is within the SA or D2D data period in which SA or data is transmitted. OR the subframe is not earlier than X ms from a subframe in which the UE intends to transmit SA, OR the subframe satisfies the "condition for continuing D2DSS transmission," OR D2DSS of its transmit synchronization reference is detected within a time window, AND
D2DSS measurement for its transmit timing reference is less than the threshold.
The D2DSS transmission resource can be easily defined: As there are only two D2DSS resources, an out-NW UE needs to receive D2DSS from its synchronization reference in one resource while transmitting its D2DSS in the other resource. This is in line with the following agreement made in RAN1#76bis:
AGREEMENT:

For out-of-coverage UEs
Synchronization resources that occur periodically are used for transmitting D2DSS
FFS whether PD2DSCH (if supported) is transmitted
Size of a synchronization resource is FFS
It is fixed in specification
Periodicity of synchronization resources is pre-configured
Whenever a D2D Synchronization Source transmits on a synchronization resource, it transmits at least D2DSS on the synchronization resource, and receives at least D2DSS on other synchronization resource(s) (which may or may not be pre-configured)
Which synchronization resource is used for transmission is FFS
FFS: timing offset between transmit and receive resources
FFS: possible mechanism to handle the case of other out-of-coverage UEs transmitting on the same synchronization resource as the UE is transmitting on.
Furthermore, to ensure D2DSS reception of itself as well as of the other UEs, a UE shall not transmit any D2D signal/channel in a D2D subframe which is not used for its own D2DSS transmission.
Proposal 6: An out-NW UE shall not transmit any D2D signal/channel in a D2D subframe which is not used for its own D2DSS transmission.
One issue in the D2DSS reselection is when a UE performs this D2DSS reselection procedure. It was discussed in RAN1#77 whether a D2D-silent period is necessary. Although the synchronization resources appear in a periodic manner and it is expected that a UE does not transmit any D2D signals on these synchronization resources except for the one used for its own D2DSS transmissions, there can be D2DSS transmissions from eNBs or UEs un-synchronized with this periodic synchronization resources. Thus, in order to help UEs to scan any potential asynchronous D2DSSs, it is necessary to define the D2D-silent period in which this D2DSS scanning is not interfered with by transmissions from D2D UEs in their proximity. If this period is not defined, an out-NW UE may be unable to detect weak but prioritized D2DSS from eNB or in-NW UE due to the interference from the other out-NW UEs.
Proposal 7: To assist UEs with scanning for other synchronization sources for out-NW UEs, a D2D-silent period defined so that it is a multiple of the D2DSS period length.

With regard to Table 7, Embodiments 13 and 14 may be briefly summarized as follows.

Embodiment 13

The UE may fail to transmit a discovery signal in a resource pool due to, for example, WAN UL transmission or the like. Therefore, in the present invention, the rule that "the UE transmits a discovery message in the discovery pool" may be interpreted and modified as "the UE has an intention to transmit a discovery signal in the discovery pool."

Embodiment 14

In D2D communication, the SA may be transmitted first, and then the D2DSS may be transmitted. Thereby, the D2D receiving UE may fail to receive the SA in updated (or correct) synchronization. As a method to address this issue, the D2D transmitting UE may (additionally) perform synchronization transmission (by the predefined (or signaled) number of times) before SA transmission, which is similar to the condition applied to the discovery procedure. However, in this case, a single subframe D2DSS may not be sufficient to provide stable synchronization performance, particularly, for out-network UEs with a large initial frequency offset. Thus, the D2DSS is preferably transmitted in a plurality of subframes prior to transmission of the SA.

Hereinafter, (additional) embodiments for Embodiment 14 will described in relation to Table 7. For example, the following embodiments may be used for transmission of an additional D2DSS in addition to D2DSS transmission based on the rule stating "For a UE transmitting SA or D2D data, in each subframe in the D2DSS resource, the UE shall transmit D2DSS if the subframe is within the SA or D2D data period in which SA or data is transmitted."

For example, the following embodiments may be applied only to the in-coverage D2D UE (and/or the OOC D2D UE) or the RRC_CONNECTED UE (and/or the RRC_IDLE UE). As another example, the following proposed methods may be applied only to UEs having D2DSS transmission/reception capability. For example, the following embodiments may be applied only (or even) to a D2D UE performing discovery transmission(/reception) (or a D2D UE having an intention to perform discovery transmission(/reception)) and/or a D2D UE performing SA or D2D data transmission (/reception) (or a D2D UE having an intention to perform SA or D2D data transmission(/reception)).

Example 1

For example, a D2D UE having an intention to transmit SA or D2D data (or a discovery signal) (or a D2D UE performing SA or D2D data (or discovery signal) transmission) may perform D2DSS transmission on the nearest D2DSS resource before(/after) the starting point of the SA (or discovery) resource pool to which a subframe related to the corresponding SA(/D2D data) (or discovery signal) transmission (or before(/after) or at the starting point).

As another example, a D2D UE having an intention to transmit SA or D2D data (or a D2D UE performing SA or D2D data transmission) may be configured to perform D2DSS transmission in the M nearest D2DSS subframes belonging to the D2DSS resource thereof before the starting point of the SA resource pool to which a subframe related to the corresponding SA(/D2D data) transmission belongs (including the starting point). Here, for example, the value of M may be preconfigured (or fixed), or may be received from the serving cell (or D2D UE) through predefined signaling (e.g., dedicated (RRC) signaling, SIB, and/or PD2DSCH). For example, the value of M may be infinite. For example, if the value of M is infinite, the UE may continue to perform D2DSS transmission in the D2DSS subframe (unless otherwise indicated by predefined signaling). In addition, the above-described example may be applied to D2D discovery. In this case, the D2D UE having an intention to perform discovery may continue to perform D2DSS transmission in the D2DSS subframe (unless otherwise indicated by predefined signaling).

In another example, a D2D UE having an intention to perform SA or D2D data transmission (or a D2D UE that performs SA or D2D data transmission) may be configured to perform D2DSS transmission in K nearest D2DSS subframes (e.g., from the starting point of the SA resource pool) belonging to the D2DSS resource thereof within "the interval from the starting point (SF #N) of the SA resource pool to which the subframe related to the corresponding SA(/D2D data) transmission belongs to a point X ms before the starting point (i.e., the interval from SF #(N–X) to SF #(N))" or "the interval from a time (SF #(N–1)) preceding the starting point of the SA resource pool to which the subframe related to the corresponding SA(/D2D data) transmission belongs, to a time X ms before the preceding time (i.e., the interval from SF #(N–1–X) to SF #(N–1))". For example, the value of K may be received from the serving cell (or D2D UE) through predefined signaling (e.g., dedicated (RRC) signaling, SIB, and/or PD2DSCH). Here, for example, if the D2DSS resource is not present in the interval, the UE may or may not be configured to perform D2DSS transmission on the first D2DSS resource present in an operatively connected (or associated) SA resource pool. Here, for example, the D2DSS resource(s) present in the operatively connected (or associated) SA resource pool may refer to SF(s) designated as the actual SA resource pool and as D2DSS resource(s), or refer to D2DSS resource(s) present within the interval from the starting point of the SA resource pool to the end point of the SA resource pool.

As another example, a D2D UE having an intention to transmit SA or D2D data (or a D2D UE performing SA or D2D data transmission) may be configured to perform D2DSS transmission on all D2DSS resource(s) present within "the interval from the starting point (SF #N) of the SA resource pool to which the subframe related to the corresponding SA(/D2D data) transmission belongs to a point X ms before the starting point (i.e., the interval from SF #(N–X) to SF #(N))" or "the interval from a point (SF #(N–1)) preceding the starting point of the SA resource pool to which the subframe related to the corresponding SA(/D2D data) transmission belongs, to a point X ms before the preceding time (i.e., the interval from SF #(N–1–X) to SF #(N–1))".

In another example, a D2D UE having an intention to perform SA or D2D data transmission (or a D2D UE that performs SA or D2D data transmission) may be configured to perform D2DSS transmission in K nearest D2DSS subframes (e.g., from the starting point of the SA resource pool) belonging to the D2DSS resource thereof within "the interval from the starting point (SF #N) of the SA resource pool to which the subframe related to the corresponding SA(/D2D data) transmission belongs to a point X ms before the starting point (i.e., the interval from SF #(N–X) to SF #(N))" or "the interval from a time (SF #(N–1)) preceding the starting point of the SA resource pool to which the subframe related to the corresponding SA(/D2D data) transmission belongs, to a time X ms before SF #(N–1) (i.e., the interval from SF #(N–1–X) to SF #(N–1))". Here, for example, the value of K may be preset (or fixed) or may be received from the serving cell (or D2D UE) through predefined signaling (e.g., dedicated (RRC) signaling, SIB, and/or PD2DSCH).

In another example, a D2D UE having an intention to perform SA or D2D data transmission (or a D2D UE that performs SA or D2D data transmission) may be configured to perform D2DSS transmission on the first D2DSS resource present in the SA resource pool to which the corresponding SA(/D2D data) transmission related subframe belongs or in the V nearest D2DSS subframes (from the SA resource pool starting point) belonging to the D2DSS resources thereof within the SA resource pool to which the corresponding SA(/D2D data) transmission related subframe belongs. Here, for example, the V value may be preconfigured (or fixed), or may be received from the serving cell (or D2D UE) through predefined signaling (e.g., dedicated (RRC) signaling, SIB, and/or PD2DSCH).

Example 2

For example, a D2D UE having an intention to transmit SA or D2D data (or a D2D UE performing SA or D2D data transmission) may be configured to perform D2DSS transmission on the nearest D2DSS resource before a subframe time related to the corresponding SA(/D2D data) transmission (or before and at the subframe time related to the corresponding SA(/D2D data) transmission). As another example, a D2D UE having an intention to perform SA or D2D data transmission (or a D2D UE that performs SA or D2D data transmission) may be configured to perform D2DSS transmission in the M nearest D2DSS subframes belonging to the D2DSS resource thereof before a subframe time related to the corresponding SA(/D2D data) transmission (or before and at the subframe time related to the corresponding SA(/D2D data) transmission). Here, for example, the value of M may be preconfigured (or fixed), or may be received from the serving cell (or D2D UE) through predefined signaling (e.g., dedicated (RRC) signaling, SIB, and/or PD2DSCH).

In another example, a D2D UE having an intention to transmit SA or D2D data (or a D2D UE performing SA or D2D data transmission) may be configured to perform D2DSS transmission on the nearest D2DSS resource (from the SA/D2D data transmission-related time) existing in "the interval from the SA(/D2D data) transmission-related subframe (SF) time (SF #N) to the time X ms before SF #N (i.e., from SF #(N−X) to SF #N)". Here, for example, the value of X may be preset (or fixed), or may be received from the serving cell (or D2D UE) through predefined signaling (e.g., dedicated (RRC) signaling, SIB, and/or PD2DSCH). Here, for example, if the D2DSS resource does not exist in the corresponding interval, the UE may be configured not to perform D2DSS transmission.

In another example, a D2D UE having an intention to transmit SA or D2D data (or a D2D UE performing SA or D2D data transmission) may be configured to perform D2DSS transmission on all D2DSS resource(s) existing in "the interval from the SA(/D2D data) transmission-related SF time (SF #N) to the time X ms before SF #N (i.e., from SF #(N−X) to SF #N)" or "the interval from a time (SF #(N−1)) preceding the SA/D2D data transmission-related SF to a time X ms before SF #(N−1) (i.e., from SF #(N−1−X) to SF #(N−1))".

In another example, a D2D UE having an intention to transmit SA or D2D data (or a D2D UE performing SA or D2D data transmission) may be configured to perform D2DSS transmission in the K nearest D2DSS subframes belonging to the D2DSS resource thereof (from the SA(/D2D data) transmission-related SF time) present in "the interval from the SA(/D2D data) transmission-related SF time (SF #N) to the time X ms before SF #N (i.e., from SF #(N−X) to SF #N)" or "the interval from a time (SF #(N−1)) preceding the SA(/D2D data) transmission-related SF time to a time X ms before SF #(N−1) (i.e., from SF #(N−1−X) to SF #(N−1))". Here, for example, the value of K may be preset (or fixed), or may be received from the serving cell (or D2D UE) through predefined signaling (e.g., dedicated (RRC) signaling, SIB, and/or PD2DSCH).

In another example, a D2D UE having an intention to transmit SA or D2D data (or a D2D UE performing SA or D2D data transmission) may be configured to perform D2DSS transmission on the nearest D2DSS resource within an SA(/D2D data) period before the SA(/D2D data) period including the corresponding SA(/D2D data) transmission-related SF time (SF #N), may be configured to perform D2DSS transmission on all D2DSS resource(s) within an SA(/D2D data) period before the SA(/D2D data) period including the corresponding SA(/D2D data) transmission-related SF time (SF #N), or may be configured to perform D2DSS transmission in the Q nearest D2DSS subframes belonging to the D2DSS resource thereof (from the starting point of the SA(/D2D data) period including the SA(/D2D data) transmission-related SF time (SF #N)) within an SA(/D2D data) period before the SA(/D2D data) period including the SA(/D2D data) transmission-related SF time (SF #N). Here, for example, the D2D UE may be configured to additionally perform D2DSS transmission on the D2DSS subframe(s) belonging to the D2DSS resource thereof in an interval from the starting point of the SA(/D2D data) period including the SA(/D2D data) transmission-related SF time to (a time before) the SA(/D2D data) transmission-related SF time. In addition, for example, the value of Q may be preset (or fixed), or may be received from the serving cell (or D2D UE) through predefined signaling (e.g., dedicated (RRC) signaling, SIB, and/or PD2DSCH).

In another example, if D2DSS ONLY TX (e.g., NO PD2DSCH TX) conflicts with transmission of another signal (for example, if they partially (or fully) overlap (in a time region other than the time-frequency region or the frequency domain)), D2DSS TX may be prioritized (for example, the other D2D signal TX may be omitted). Here, the D2DSS TX may refer to, for example, time/frequency resource(s) related to PD2DSS and SD2DSS transmission, (all) symbol(s) related to PD2DSS and SD2DSS transmission, time/frequency resource(s) related to PD2DSS transmission, time/frequency resource(s) related to SD2DSS transmission, or (all) symbol(s) related to SD2DSS transmission. In addition, for example, the other signal may include at least one of predefined (or signaled) (Mode 1/Mode 2) SA, (Mode 1/Mode 2) data, and (Type 1/Type 2A/Type 2B) discovery or a WAN UL signal. As another example, when D2DSS TX and PD2DSCH TX are performed together (at the same (D2DSS) SF time), if only PD2DSCH TX conflicts with the other signal TX (or partially (or fully) overlap other signal TX in a time region other than the time-frequency region or the frequency domain), D2DSS TX (to be performed together at the same (D2DSS) SF time) may be performed as intended, and PD2DSCH TX may be omitted (for example, the other signal TX is performed). Alternatively, both D2DSS TX and PD2DSCH TX may be omitted (for example, the other signal TX is performed). Here, PD2DSCH TX may refer to, for example, PD2DSCH transmission-related time/frequency resource(s) or (all) symbol(s) related to PD2DSCH transmission.

In addition, for example, application of such a rule may be applied only in the case where the other signal is a D2D signal based on eNB triggering (or scheduling) (and/or a predetermined specific D2D signal).

As another example, when D2DSS TX and PD2DSCH TX are performed together (at the same (D2DSS) SF time), if only PD2DSCH TX conflicts with the other signal TX (or partially (or fully) overlap other signal TX in a time region other than the time-frequency region or the frequency domain), D2DSS TX and PD2DSCH TX (which are to be performed together at the same (D2DSS) SF time) will be performed (for example, the other signal TX is omitted).

As another example, in the case of D2DSS ONLY TX (e.g., NO PD2DSCH TX), if the other signal TX does not overlap time/frequency resource(s) related to PD2DSS and SD2DSS transmission, (all) symbol(s) related to PD2DSS and SD2DSS transmission, time/frequency resource(s) related to PD2DSS transmission, time/frequency resource(s) related to SD2DSS transmission, or (all) symbol(s) related to SD2DSS transmission, but overlap a D2DSS subframe in which the PD2DSS and SD2DSS transmission (or the PD2DSS transmission or the SD2DSS transmission) is performed, the corresponding other signal TX may be omitted (for example, PD2DSS and SD2DSS transmission (or PD2DSS transmission or SD2DSS transmission) is performed), or both the other signal TX and the PD2DSS and SD2DSS transmission (or PD2DSS transmission or SD2DSS transmission) may be performed, or only the other signal TX may be performed (for example, the PD2DSS and SD2DSS transmission (or PD2DSS transmission or SD2DSS transmission) may be omitted).

As another example, the D2D UE may recognize whether the serving cell (or a specific cell) supports (configures) only D2D discovery (or supports (configures) only D2D communication or supports (configures) both D2D discovery and D2D communication), based on part or all of the methods described below.

In the embodiments (for example, Embodiments 13, 14, and 15), having an intention to transmit SA/data/discovery may mean that i) a packet to be transmitted has been generated on the higher layer, or that ii) data to be sent to the UE buffer has been generated on the higher layer. Alternatively, having an intention to transmit SA/data/discovery may mean iii) occurrence of actual packet transmission occurs, or iv) having interest in sending a packet in a particular application. Here, for example, having interest may mean that transmission of an actual packet from a higher layer (e.g., application layer) to a lower layer (e.g., a TRANSPORT, MAC, or PHYSICAL layer) does not occur, but a packet will be generated in the near future (not too far away), and for this purpose the information for indicating "interest" is delivered/indicated to the lower layer. In addition, having interest may mean that the UE has sent an INTEREST in discovery TX or a resource request to the network (within a recent time period).

For example, currently, the D2DSS SF related to the discovery pool is defined as the first SF of the discovery resource pool (if the first SF is set as a D2DSS resource) or the D2DSS resource nearest to the starting point of the discovery resource pool (if the first SF of the discovery resource pool is not set as a D2DSS resource). In this case, if a message (or packet) is generated after the D2DSS SF and is transmitted in the middle of the discovery pool, the corresponding message (or packet) may be transmitted without D2DSS transmission. The above-described "transmission intention"-based D2DSS transmission method may attenuate this problem.

As another example, transmission of a message (or packet) (in the middle of a pool) without (pre-)D2DSS transmission may be omitted (for example, interference generated from the D2D signal may be attenuated by omitting transmission of a D2D signal with relatively low reception performance transmitted without (pre-)transmission of the synchronization signal).

For example, this method may be valid for a D2D relay UE that transmits a discovery signal to an out-of-coverage D2D UE. For example, it may be assumed that D2DSS transmission is performed in accordance with the meaning of "having an intention to transmit" mentioned above. If a probability-based transmission scheme is configured in a specific D2D resource pool on the physical layer, it may be considered that there is an intention to perform transmission even if transmission does not actually occur. Here, the probability-based transmission scheme may mean that the network sets a predetermined transmission probability, and the UE performs actual transmission according to transmission probability. In this case, the UE may perform D2DSS transmission, considering that there is an intention to transmit a D2D signal although D2D signal transmission does not actually occur.

For example, when probability-based transmission is configured in a (specific) discovery resource pool, the UE may perform D2DSS transmission, considering that there is an intention for discovery signal transmission in the first SF of the discovery resource pool (if the first SF is configured as a D2DSS resource) or on the nearest D2DSS resource before the starting point of the discovery resource pool (if the first SF of the discovery resource pool is not configured as a D2DSS resource) even though a UE having determined whether to transmit a discovery signal by the indicated probability value has not actually transmitted the discovery signal in the specific discovery resource pool. Here, for example, the "the starting point of the discovery resource pool" may mean a time indicated by a discovery offset indicator (within the discovery resource pool period), a time at which a bitmap related to the first discovery resource pool is applied (within the discovery resource pool period), or a time designated as '1' for the first time in a bitmap related to a discovery resource pool that is applied first (within the discovery resource pool period).

However, if it is interpreted that only the case where actual packet transmission occurs corresponds to having an intention to transmit, as in the above-described meaning iii) of "having an intention transmit", the corresponding UE will not perform D2DSS transmission on a D2DSS resource associated with the discovery resource pool in which actual transmission does not occur. In this case, the UE may need to determine D2D signal transmission at or before the D2DSS transmission subframe.

The above-mentioned meaning of "having an intention to transmit" may be applied as a reference which forms the basis on which a discovery capable D2D UE (without D2D communication capability) and/or a communication capable D2D UE determines discovery-related D2DSS transmission and/or communication-related D2DSS transmission. For example, meaning of "having an intention to transmit" may be applied as a reference which forms the basis on which a communication capable D2D UE determines D2DSS transmission in a D2DSS subframe (D2DSS resource) within a specific SA period.

Embodiment 15

Methods for determining whether a TX pool or RX pool for D2D communication is configured (established) are presented. For example, whether or not (Mode 1 or Mode 2) communication of the serving cell (or a specific cell) is configured may be determined according to whether the SA pool is configured. In particular, this method may be useful, for example, in determining whether Mode 1 communication without a separate data pool configuration is configured (by using, for example, the characteristics of the SA, which is always transmitted prior to D2D data). Here, for example, if the SA pool is not configured, the D2D UE may assume (or determine) that the serving cell (or a specific cell) supports (configures) only D2D discovery.

As another example, whether or not communication of the serving cell (or a specific cell) is configured may be determined according to whether a communication data pool is configured (in particular, in determining, for example, whether Mode 2 communication is configured). As another example, a separate field to indicate whether or not D2D communication is allowed may be defined in pre-designated signaling (e.g., SIB(18)). Here, for example, a D2D UE receiving the signaling that serves this purpose may recognize whether the serving cell (or a specific cell) supports (configures) D2D communication according to the corresponding field value. Here, for example, if the corresponding field indicates that D2D communication is not supported (configured), the D2D UE may assume (or determine) that the serving cell (or the specific cell) supports (configures) only D2D discovery.

As another example, a separate field to indicate whether only D2D discovery is supported (configured), whether only D2D communication is supported (configured), and/or whether D2D discovery and D2D communication are both supported (configured) may be defined in pre-designated signaling (e.g., SIB (18/19)).

Embodiment 16

The D2D UE may determine whether the serving cell (or a specific cell) supports (configures) only D2D discovery, only D2D communication, or both D2D discovery and D2D communication, depending on whether system information related to (SA and/or D2D data) pool configuration for D2D communication is present on the system information signaling of the serving cell (or the specific cell), and/or whether pool configuration-related system information (e.g., SIB 19) for D2D discovery is present (or configured) in the system information signaling. Here, for example, if only the pool configuration-related system information for D2D discovery is present or configured in the system information signaling of the serving cell (or the specific cell) (for example, if (SA and/or D2D data) pool configuration-related system information for D2D communication is not present or configured), the D2D UE may assume (or determine) that the corresponding serving cell (or the specific cell) supports (configures) only D2D discovery.

In another example, if both system information related to pool configuration for D2D discovery and system configuration information related to (SA and/or D2D data) pool configuration for D2D communication are present (or configured) on the system information signaling of the serving cell (or a specific cell), the D2D UE may assume (or determine) that the serving cell (or the specific cell) supports (configures) both D2D discovery and D2D communication.

In another example, when overlap occurs between D2D signal (TX) resources (or D2D signal (TX) resource pools) of different kinds (and/or types and/or modes) (in a time/frequency resource region) or when overlap occurs between a D2D signal (TX) resource (or a D2D signal (TX) resource pool) and an SRS TX resource (in a time/frequency resource region), a signal transmission-related priority rule may be defined as shown in Table 8.

modes) are configured in SF #N and SF #(N+1), the D2D signal transmission-related timing advance (TA) value on SF #(N+1) is greater than one symbol, the D2D signal transmission-related priority rule may be defined based on some (or all) embodiments below.

Here, for example, some or all of the following embodiments may be applied only when D2D signal transmission on SF #N is configured to be performed without TA (or configured to be performed on a DL timing basis). For example, the D2D signal that is transmitted without TA (or transmitted on the basis of DL Timing) may be defined as a D2DSS, a PD2DSCH, a Type 2B/2A discovery signal, a Type 1 discovery signal, Mode 2 data, and/or SA.

On the other hand, a D2D signal transmitted with application of TA (or transmitted on a UL Timing basis) may be defined as Mode 1 data or the like. In addition, for example, some or all of the following embodiments may be applied even to a case where D2D signal (TX) resources (or D2D signal (TX) resource pools) of different kinds (and/or types and/or modes) are configured on SF #N and SF #(N+1), and D2D signal transmission on SF #N overlap D2D signal transmission on SF #(N+1) in a time(/frequency) resource region.

Embodiment 17-1

When the SF #N is configured as a D2DSS SF related to D2DSS(/PD2DSCH) transmission and the SF #(N+1) is configured as a resource related to the other D2D signal transmission, the other D2D signal transmission on SF #(N+1) may be exceptionally omitted (or dropped). For example, Embodiment 17-1 may be an exception to a rule stating that "For all UEs, UE drops the entire D2D transmission in Subframe #N if a D2D transmission without TA is scheduled in Subframe #N and a transmission with TA>1 symbol is scheduled in Subframe #(N+1)".

Embodiment 17-2

Even if SF #N is configured as a D2DSS SF related to D2DSS(/PD2DSCH) transmission and the SF #(N+1) is configured as a resource related to the other D2D signal transmission, D2DSS(/PD2DSCH) transmission on SF #N may be omitted (or dropped) according to the rule "For all UEs, UE drops the entire D2D transmission in Subframe #N if a D2D transmission without TA is scheduled in Subframe #N and a transmission with TA>1 symbol is scheduled in Subframe #(N+1)" described above in relation to Table 8.

TABLE 8

For all UEs, 1-symbol gap is used in every D2D transmission subframe
UE drops the entire D2D transmission in subframe n if a D2D transmission without TA is scheduled in subframe n and a transmission with TA > 1 symbol is scheduled in subframe n + 1
Discovery, SA and data transmissions shall not take place in D2DSS subframes configured for transmission of D2DSS
In case of time-domain collisions from a single UE's perspective between the allocated Type 2B discovery resource and the randomly selected Type 1 discovery resource, the UE should prioritize transmission on Type 2B discovery resource and drop Type 1 discovery transmission on that subframe
A UE drops the entire D2D transmission in sub-frame n if the UE transmits an uplink SRS signal in a sub-frame n on the same component carrier except for Mode 1 data if Mode 1 data CP length and WAN CP length are equal Embodiment 17

When D2D signal (TX) resources (or D2D signal (TX) resource pools) of different kinds (and/or types and/or Here, for example, Embodiment 17-2 may be interpreted as an exception to the rule "discovery, SA and data transmissions shall not take place in D2DSS subframes configured for transmission of D2DSS".

Embodiment 17-3

If SF #N is configured as a resource related to predefined (or signaled) D2D signal transmission and SF #(N+1) is configured as a resource related to other D2D signal transmission, the other D2D signal transmission on SF #(N+1) may be exceptionally omitted (or dropped). Here, for example, the predefined (or signaled) D2D signal(s) on the SF #N to which this rule is applied may include an SA (e.g., a channel on which control(/scheduling) information is transmitted), a D2DSS(/PD2DSCH) (e.g., a channel on which synchronization(/D2D communication-related system(/resource configuration)) information is transmitted), a Type 2B/2A discovery signal, a Type 1 discovery signal, and/or Mode 2 data. Here, for example, Embodiment 17-3 may be an exception to the rule "For all UEs, UE drops the entire D2D transmission in Subframe #N if a D2D transmission without TA is scheduled in Subframe #N and a transmission with TA>1 symbol is scheduled in Subframe #(N+1)" described above in relation to Table 8.

In another example, if SF #N is configured as a resource related to predefined (or signaled) D2D signal transmission and SF #(N+1) is configured as a resource related to other D2D signal transmission, D2D signal transmission on SF #N may be omitted (or dropped). Here, for example, the predefined (or signaled) D2D signal(s) on the SF #N to which this rule is applied may include an SA (e.g., a channel on which control(/scheduling) information is transmitted), a D2DSS(/PD2DSCH) (e.g., a channel on which synchronization/D2D communication-related system/resource configuration information is transmitted), a Type 2B/2A discovery signal, a Type 1 discovery signal, and/or Mode 2 data.

Embodiment 17-4

If SF #N is configured as a resource related to D2D signal transmission based on eNB scheduling (or triggering) and SF #(N+1) is configured as a resource related to other D2D signal transmission, the other D2D signal transmission on SF #(N+1) may be exceptionally omitted (or dropped). Here, for example, the eNB scheduling (or triggering)-based D2D signal(s) on SF #N to which this rule is applied may be Mode 1 SA, Mode 1 data, a Type 2B(/2A) discovery signal, and/or a D2DSS(/PD2DSCH). Here, for example, application of the rule may be interpreted as an exception to the rule "For all UEs, UE drops the entire D2D transmission in Subframe #N if a D2D transmission without TA is scheduled in Subframe #N and a transmission with TA>1 symbol is scheduled in Subframe #(N+1)" described above in relation to Table 8.

In another example, if SF #N is configured as a resource related to D2D signal transmission based on eNB scheduling (or triggering) and SF #(N+1) is configured as a resource related to other D2D signal transmission, D2D signal transmission on SF #N may be omitted (or dropped). Here, for example, the eNB scheduling (or triggering)-based D2D signal(s) on SF #N to which this rule is applied may include Mode 1 SA, Mode 1 data, a Type 2B(/2A) discovery signal, and/or a D2DSS(/PD2DSCH).

Embodiment 17-5

Even if SF #N is configured as a resource related to D2D signal transmission of a specific kind (and/or type and/or mode), the rule "For all UEs, UE drops the entire D2D transmission in Subframe #N if a D2D transmission without TA is scheduled in Subframe #N and a transmission with TA>1 symbol is scheduled in Subframe #(N+1)" described in Table 8 may be applied. Here, application of the rule may mean, for example, that D2D signal transmission on SF #N is always omitted (or dropped), and that that the rule "For all UEs, UE drops the entire D2D transmission in Subframe#N if a D2D transmission without TA is scheduled in Subframe#N and a transmission with TA>1 symbol is scheduled in Subframe #(N+1)" is prioritized over the rule "Discovery, SA and data transmissions shall not take place in D2DSS subframes configured for transmission of D2DSS."

Embodiment 17-6

The serving eNB or a D2D UE may deliver, to (another) D2D UE, information about whether or not (some or all of) the above-described embodiments (e.g., Embodiments 17-1, 17-2, 17-3, 17-4 and/or 17-5) through a predefined signal (e.g., SIB, dedicated RRC signaling, and/or PD2DSCH). In addition, such information may be fixed or preconfigured in the specifications of the UE.

In the embodiments described above, the D2DSS resource (and/or the D2DSS subframe) may refer to a D2DSS (TX(/RX)) resource of a serving cell, a D2DSS (RX(/TX)) subframe, a D2DSS (RX(/TX)) resource of a neighbor cell, and/or a D2DSS (RX(/TX)) subframe. Here, for example, the D2DSS (RX(/TX)) resource (and/or D2DSS (RX(/TX) subframe) of the neighbor cell may be considered (or included) as a (final) D2DSS (RX(/TX)) resource (and/or D2DSS (RX(/TX)) subframe). In this case, for example, if the neighbor cell D2DSS resource is configured at the time of SERVING CELL SF #N and synchronization error information related to the neighbor cell of W1 is received (see Table 8), a region from 'SF#N−CEILING(W1)−1' to 'SF#N−CEILING(W1)+1' (or a region from 'SF#N−CEILING(W1)' to 'SF#N+CEILING(W1)') may be considered or included as the D2DSS RX/TX resource of the neighbor cell. Here, for example, the CEILING(X) function (for example, a function that derives a minimum integer greater than or equal to X) may be replaced by the FLOOR(X) function (for example, a function that derives a maximum integer less than or equal to X).

As another example, whether or not other D2D signal(s) (and/or WAN (UL/DL) signal(s)) on the D2DSS resource(s) are received and/or transmitted may be determined based on all or some of the following examples.

Example O

The D2D UE may not be allowed to receive and/or transmit other D2D signal(s) (and/or WAN (UL/DL) signal(s)) only on a D2DSS (TX/RX) resource related to the serving cell thereof (and/or D2DSS (TX(/RX)) subframe). In other words, for example, the UE may be allowed to receive and/or transmit other D2D signal(s) and/or WAN (UL/DL) signal(s) on the D2DSS (RX(/TX)) resource (and/or D2DSS (TX(/RX)) subframe) of a neighbor cell.

Example P

If neighbor cell-related synchronization error information of W1 is received (see Table 8), reception and/or transmission of other D2D signal(s) (and/or WAN (UL/DL) signal(s)) may not be allowed only at the corresponding neighbor cell-related D2DSS (TX(/RX)) resource (and/or D2DSS (TX(/RX)) subframe) position(s) identified (through synchronization blind discovery). In other words, reception and/or transmission of other D2D signal(s) (and/or WAN (UL/DL) signal(s)) may not be allowed only at the corresponding neighbor cell-related D2DSS (TX(/RX)) resource (and/or D2DSS (TX(/RX)) subframe) position(s) identified (through synchronization blind discovery) and actually overlapping position(s) may not be allowed.

Example Q

If neighbor cell-related synchronization error information of W1 is received (see Table 8), and, for example, a neighbor cell D2DSS resource is configured at the time of SERVING CELL SF #N, reception and/or transmission of other D2D signal(s) (and/or WAN (UL/DL) signal(s)) may not be allowed in a region from 'SF#N−CEILING(W1)−1' to 'SF#N−CEILING(W1)+1' (or a region from 'SF#N−CEILING(W1)' to 'SF#N+CEILING(W1)'). Application of this rule may mean, for example, that a neighbor cell-related D2DSS (TX(/RX)) resource (and/or D2DSS (TX(/RX)) subframe) is (virtually) considered as the region from 'SF#N−CEILING(W1)−1' to 'SF#N−CEILING(W1)+1' (or the region from 'SF#N−CEILING(W1)' to 'SF#N−CEILING(W1)').

Example R

If neighbor cell-related synchronization error information of W2 is received (see Table 8), reception and/or transmission of other D2D signal(s) (and/or WAN (UL/DL) signal(s)) may not be allowed either on the serving cell-related D2DSS (TX(/RX)) resource (and/or D2DSS (TX(/RX)) subframe) or in a region overlapping a neighbor cell-related D2DSS (TX(/RX)) resource (and/or D2DSS (TX(/RX)) subframe). In another example, if the neighbor cell-related synchronization error information of W2 is received (see Table 8), reception and/or transmission of other D2D signal(s) (and/or WAN (UL/DL) signal(s)) may not be allowed only in the region overlapping the serving cell-related D2DSS (TX(/RX)) resource (and/or D2DSS (TX(/RX)) subframe) (or the neighbor cell-related D2DSS (TX(/RX)) resource (and/or D2DSS (TX(/RX)) subframe)).

A message transmitted by a UE in D2D communication may have a specific priority. That is, the priority may be determined according to the relative importance of the D2D message, and a message having higher priority may be preferentially transmitted compared to a message having lower priority. In this environment, the above-described SILENT_DURATION may be configured with a different position, period, length, etc. according to the priority of the message transmitted by the UE. For example, a relatively short time interval may be set as SILENT_DURATION for a message having high priority to reduce the time for interruption of message transmission and to increase the probability of successful message transmission and improve delay-related performance. On the other hand, a relatively long time interval may be set as SILENT_DURATION for a message having a lower priority to make it easier to detect other synchronization signals while lowering message transmission performance.

If the SILENT_DURATION configuration is changed according to the priority as described above, even a UE transmitting a low-priority message may be guaranteed to receive a high-priority message through at least some intervals. This may be carried out through SILENT_DURATION for the low priority but may be carried out through an interval other than SILENT_DURATION for the high priority. As a result, a D2D (message) TX(/RX) operation with a relatively high priority may be performed (or ensured) more smoothly than a D2D (message) TX(/RX) operation, according to predefined (or signaled) application/group/user priorities.

As another example, SILENT_DURATION which has a (partially or fully) different configuration for (some or all) D2D (message) TXs(/RXs) (or D2D (message) TX(/RX) resource pools) with different priorities may refer to: •a (time) interval in which the D2D (message) TX(/RX) operation having a relatively high specific priority is always performed(/ensured); •a (time) interval in which the D2D (message) TX(/RX) operation having a relatively high specific priority is performed(/ensured) at a high probability (or a probability higher than or equal to a preset (or signaled) probability); •a (time) interval in which a preset (or signaled) (substantial or average) number (or more than a preset (or signaled) (substantial or average) number) of D2D (message) TX(/RX) operations having a relatively high specific priority are performed(/ensured); •a (time) interval in which the D2D (message) TX(/RX) operation having a relatively high specific priority is performed(/ensured) at a value less than a preset (or signaled) maximum value (and/or greater than minimum value); •a (time) interval in which the D2D (message) TX(/RX) operation having a relatively low specific priority is interrupted(/omitted); •a (time) interval in which the D2D (message) TX(/RX) operation having a relatively low specific priority is interrupted(/omitted) at a high probability (higher than or equal to a preset (or signaled) probability); •a (time) interval in which a preset (or signaled) (substantial or average) number (or more than a preset (or signaled) (substantial or average) number) of D2D (message) TX(/RX) operations having a relatively low specific priority are interrupted(/omitted); or •a (time) interval in which the D2D (message) TX(/RX) operation having a relatively low specific priority may be interrupted(/omitted) at a value less than a preset (or signaled) maximum value (and/or greater than minimum value).

Here, for example, the SILENT_DURATION configuration-related parameters may include a period (SL_PERIOD) (of SILENT_DURATIONs) and/or a length (SL_length) (related to one SILENT_DURATION) (and/or an offset (SL_STARTINGOFFSET) (at which a SILENT_DURATION is given with respect to SFN #0)). Here, for example, in the case of D2D communication (message) TX(/RX) (or a D2D communication (message) TX(/RX) resource pool), the SL_length parameter related to the D2D communication (message) TX(/RX) (or the D2D communication (message) TX(/RX) resource pool) may be configured in the form of K SC PERIOD(s).

As another example, the SILENT_DURATION related to a D2D (message) TX(/RX) (or D2D (message) TX(/RX) resource pool) having a specific priority may be defined as the "minimum (or maximum) Y % for X ms." For example, when X=20000 and Y=2 are given (or signaled), SILENT_DURATION related to a D2D (message) TX(/RX) (or D2D (message) TX(/RX) resource pool) having a specific priority is 400 ms. For example, the SILENT_DURATION configuration-related parameter information may be indicated to the (D2D) UE by the eNB through a predefined signal (e.g., SIB, dedicated RRC). For example, the eNB may indicate the SILENT_DURATION configuration-related parameter information to an out-of-coverage (OOC) UE through the PRE-CONFIGURATION on the SIB. In addition, a D2D UE may indicate the SILENT_DURATION configuration-related parameter information to another D2D UE through a predefined channel (or signal) (e.g., PSBCH, PSDCH, PSSCH(/PSCCH)).

For example, when the above-described embodiments and examples are applied, a D2D TX(/RX) UE performing a (relatively) low-priority D2D (message) TX(/RX) operation may stop(/omit) the (relatively) low-priority D2D (message) TX(/RX) operation in the SILENT_DURATION configured for the (relatively) low-priority D2D (message) TX(/RX) operation (or the corresponding (relatively) low-priority D2D (message) TX(/RX) pool) and perform another (preconfigured (or signaled)) D2D (message) TX(/RX) operation of a different (relatively high) priority. Here, for example, by applying this rule, a (relatively) high-priority D2D (message) TX(/RX) operation may be efficiently guaranteed for the corresponding D2D TX(/RX) UE.

As another example, to allow the (relatively) high-priority D2D (message) TX(/RX) operation to be smoothly performed or ensured compared to the (relatively) low-priority D2D (message) TX(/RX) operation, different (available) Time Resource Pattern (TRP) candidates may be configured (or limited) for (some or all) D2D (message) TXs(/RXs) (or D2D (message) TX(/RX) resource pools) with different priorities. Here, for example, by configuring TRP candidates including a (relatively) small number of '1's (or having a (relatively) small amount of resources that may be designated with the (one) TRP) for the (relatively) low-priority D2D (message) TX(/RX) operation, the amount of resources used (or available) for the (relatively) high-priority D2D (message) TX(/RX) operation may be increased.

It is apparent that examples of the above-described embodiments may also be included as one of the implementation methods of the present invention, and thus may be considered as embodiments. Furthermore, the above-described embodiments may be implemented independently, or a combination of some of the embodiments may be implemented. The embodiments described above may be applied only in the FDD system (or TDD system) environment. The embodiments described above may be applied only in discovery message transmission (of a specific type/mode), D2D data channel transmission, or SA transmission. The embodiments described above may be applied only to a D2D UE performing only D2D discovery (TX/RX) operation (and/or a D2D UE performing only a D2D communication (TX/RX) operation). The embodiments described above may be applied only in a scenario in which only D2D discovery is supported (configured) (and/or a scenario in which only D2D communication is supported (configured)). The above-described embodiments may be applied only to the in-coverage D2D UE and/or the out-of-coverage D2D UE (or the RRC_CONNECTED D2D UE and/or the RRC_IDLE D2D UE). In addition, the above-described embodiments may be applied only to Mode 2 communication and/or Type 1 discovery (and/or Mode 1 communication and/or Type 2 discovery). In addition, some or all of the above-described embodiments may be applied only to Public Safety (PS) discovery/communication and/or non-PS discovery/communication.

Figure 15:
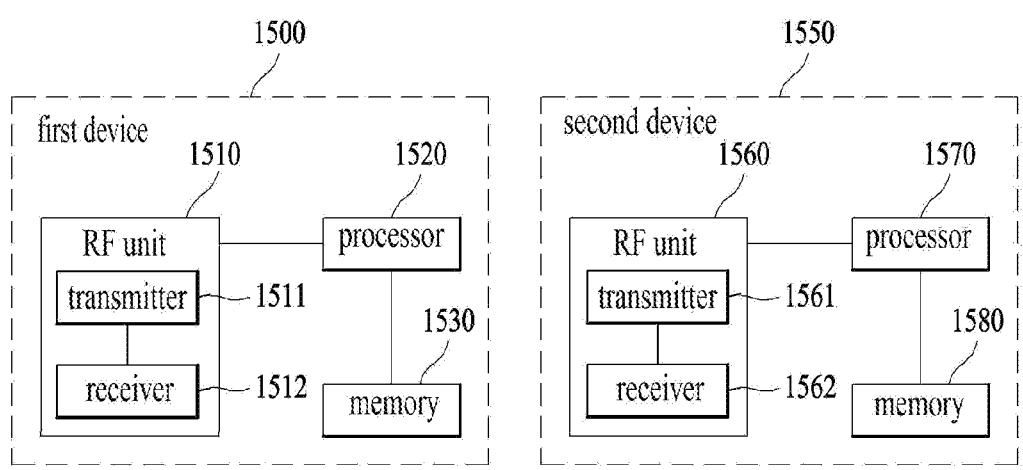
FIG. 15 is a schematic diagram illustrating devices according to an embodiment of the present invention.

FIG. 15 is a schematic diagram illustrating configuration of devices to which the embodiments of the present invention described with reference to FIGS. 1 to 14 may be applied according to an embodiment of the present invention.

In FIG. 15, each of a first device 1500 and a second device 1550, which are D2D UEs, includes a radio frequency (RF) unit 1510, 1560, a processor 1520, 1570, and, optionally, a memory 1530, 1580. Although FIG. 15 shows configuration of two D2D UEs, a plurality of D2D UEs may establish a D2D communication environment.

Each of the RF unit 1530 and 1560 may include a transmitter 1511, 1561 and a receiver 1512, 1562. The transmitter 1511 and the receiver 1512 of the first device 1500 may be configured to transmit and receive signals to and from the second device 1550 and other D2D UEs, and the processor 1520 may be functionally connected to the transmitter 1511 and the receiver 1512 to control the transmitter 1511 and the receiver 1512 to transmit and receive signals to and from other devices. Meanwhile, the first device 1500 and/or the second device 1550 may be an eNB.

The processor 1520 may perform various kinds of processing on a signal to be transmitted, and then transmit the signal to the transmitter 1511, and process a signal received by the receiver 1512. If necessary, the processor 1520 may store, in the memory 1530, information contained in an exchanged message.

With the above-described structure, the first device 1500 may perform the methods of the various embodiments of the present invention described above. For example, each signal and/or message may be transmitted and received using a transmitter and/or receiver of the RF unit, and each operation may be performed under control of the processor.

Although not shown in FIG. 15, the first device 1500 may include various additional elements according to device application type. For example, if the first device 1500 is for intelligent metering, the first device 1500 may include an additional element for power measurement and the like. The operation of power measurement may be performed under control of the processor 1520 or a separately configured processor (not shown).

For example, the second device 1550 may be an eNB. In this case, the transmitter 1561 and receiver 1562 of the eNB may be configured to transmit and receive signals to and from other eNBs, D2D servers, D2D devices, and the processor 1570 may be functionally connected to the transmitter 1561 and the receiver 1562 and may be configured to control the process of the transmitter 1561 and the receiver 1562 transmitting and receiving signals to and from other devices. In addition, the processor 1570 may perform various kinds of processing on a signal to be transmitted, transmit the signal to the transmitter 1561, and process a signal received by the receiver 1562. If necessary, the processor 1570 may store, in the memory 1530, information contained in an exchanged message. With the above-described structure, the eNB 1550 may perform the methods of the various embodiments described above.

In FIG. 15, the processors 1520 and 1570 of the first device 1510 and the second device 1550 respectively instruct operations for the first device 1510 and the second device 1550 (for example, control, adjustment, management, etc.). Each of the processors 1520 and 1570 may be connected to the memory 1530, 1580 that stores program code and data. The memories 1530 and 1580 may be connected to the processors 1520 and 1570 to store operating systems, applications, and general files.

The processors 1520 and 1570 of the present invention may be referred to as a controller, a microcontroller, a microprocessor, a microcomputer, or the like. Meanwhile, the processors 1520 and 1570 may be implemented by hardware, firmware, software, or a combination thereof. When embodiments of the present invention are implemented using hardware, the processors 1520 and 1570 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processors 1520 and 1570 or may be stored in the memories 1530 and 1580 and driven by the processors 1520 and 1570.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The embodiments of the present invention as described above may be applied to various mobile communication systems.

The invention claimed is:

1. A method for transmitting a synchronization signal for Device-to-Device (D2D) discovery by a terminal, comprising:
receiving, from a base station, a signal indicating a first behavior or a second behavior for transmission of the synchronization signal of the terminal; and
transmitting the synchronization signal based on the received signal,
wherein, when the received signal indicates the first behavior and the first subframe of a discovery pool corresponds to a resource for the synchronization signal, the synchronization signal is transmitted in the first subframe,
wherein, when the received signal indicates the first behavior and the first subframe does not correspond to the resource for the synchronization signal, the synchronization signal is transmitted on a resource for the synchronization signal nearest and prior to the first subframe,
wherein, when the received signal indicates the second behavior, the synchronization signal is transmitted at a predetermined period within the discovery pool.

2. The method according to claim 1, wherein the signal indicating the first behavior or the second behavior is received via at least one of Radio Resource Control (RRC) signaling and System Information Block (SIB) signaling.

3. The method according to claim 1, wherein the terminal is configured to perform type 1 discovery by higher layer signaling.

4. The method according to claim 1, wherein the predetermined period is 40 MS.

5. The method according to claim 1, wherein information on the resource for the synchronization signal is received via higher layer signaling.

6. A terminal for transmitting a synchronization signal for Device-to-Device (D2D) communication, comprising:
a transceiver configured to transmit and receive a radio signal; and
a processor configured to control the transceiver,
wherein the processor is configured to:
receive, from a base station, a signal indicating a first behavior or a second behavior for transmission of the synchronization signal of the terminal; and
transmit the synchronization signal based on the received signal,
wherein, when the received signal indicates the first behavior and the first subframe of a discovery pool corresponds to a resource for the synchronization signal, the synchronization signal is transmitted in the first subframe,
wherein, when the received signal indicates the first behavior and the first subframe does not correspond to the resource for the synchronization signal, the synchronization signal is transmitted on a resource for the synchronization signal nearest and prior to the first subframe,
wherein, when the received signal indicates the second behavior, the synchronization signal is transmitted at a predetermined period within the discovery pool.

7. The terminal according to claim 6, wherein the signal indicating the first behavior or the second behavior is received via at least one of Radio Resource Control (RRC) signaling and System Information Block (SIB) signaling.

8. The terminal according to claim 6, wherein the terminal is configured to perform type 1 discovery by higher layer signaling.

9. The terminal according to claim 6, wherein the predetermined period is 40 MS.

10. The terminal according to claim 6, wherein information on the resource for the synchronization signal is received via higher layer signaling.

* * * * *